(12) United States Patent
Nakajima et al.

(10) Patent No.: US 6,987,903 B2
(45) Date of Patent: Jan. 17, 2006

(54) OPTICAL TRANSMISSION NETWORK, OPTICAL TRANSMISSION APPARATUS, DISPERSION COMPENSATOR ARRANGEMENT CALCULATION APPARATUS AND DISPERSION COMPENSATOR ARRANGEMENT CALCULATION METHOD

(75) Inventors: Ichiro Nakajima, Kawasaki (JP); Hiroaki Tomofuji, Kawasaki (JP); Takeshi Sakamoto, Kawasaki (JP); Yuji Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/101,518

(22) Filed: Apr. 8, 2005

(65) Prior Publication Data

US 2005/0175279 A1    Aug. 11, 2005

Related U.S. Application Data

(63) Continuation of application No. PCT/JP03/005537, filed on Apr. 30, 2003.

(51) Int. Cl.
*G02B 6/28* (2006.01)

(52) U.S. Cl. .............................. 385/24; 385/31; 385/39
(58) Field of Classification Search ................... 385/24
See application file for complete search history.

(56) References Cited

U.S. PATENT DOCUMENTS

| | | | | |
|---|---|---|---|---|
| 6,556,758 | B2 * | 4/2003 | Kato | ........................... 385/127 |
| 2001/0048539 | A1 * | 12/2001 | Kubo et al. | ................... 359/161 |
| 2003/0002112 | A1 * | 1/2003 | Hirano et al. | ................ 359/161 |
| 2003/0071985 | A1 * | 4/2003 | Mori et al. | ................. 356/73.1 |

FOREIGN PATENT DOCUMENTS

JP    07-074699    3/1995

(Continued)

OTHER PUBLICATIONS

Moeser et al, "Dispersion management for randomly varying optical fibers", Apr. 15, 2004, Optics Letters, vol. 29, No. 8, pp 821-823.*

*Primary Examiner*—Ellen E. Kim
(74) *Attorney, Agent, or Firm*—Staas & Halsey LLP

(57) ABSTRACT

An optical transmission network includes a first dispersion compensator arranged in a maximum dispersion span having a maximum dispersion value and searched out from within a maximum dispersion route having a maximum dispersion value from among routes of non-regeneration intervals within which a dispersion value before dispersion compensation does not satisfy an upper limit of a dispersion tolerance, and a second dispersion compensator arranged in a maximum dispersion span having a maximum dispersion value searched out from within a maximum dispersion route having a maximum dispersion value from among the routes when a dispersion compensator is successively arranged until a route of a non-regeneration interval within which a dispersion value of a certain channel does not satisfy the dispersion tolerance does not remain any more based on the dispersion value after the dispersion compensation with respect to the searched out maximum dispersion span. The dispersion compensation amounts of the first and second dispersion compensators are such that, when the dispersion compensation amount of the maximum dispersion span in which the first and second dispersion compensators are arranged is successively increased, the span has a residual dispersion value equal to or higher than a fixed range and the maximum dispersion route which relates to the spans has a residual dispersion value which satisfies the dispersion tolerance or the span has a residual dispersion value which is within the fixed range.

26 Claims, 29 Drawing Sheets

FOREIGN PATENT DOCUMENTS

| | | |
|---|---|---|
| JP | 09-023187 A | 1/1997 |
| JP | 2000-261377 | 9/2000 |
| JP | 2002-232355 | 8/2002 |
| JP | 2003-174411 | 6/2003 |

* cited by examiner

| Span | #1 | #2 | #3 | #4 |
|---|---|---|---|---|
| Transmission line dispersion value @ch20 | 510 ps/nm | 476 ps/nm | 425 ps/nm | 85 ps/nm |
| | ⇩ | ⇩ | ⇩ | ⇩ |
| Dispersion compensation amount @ch20 | −500 ps/nm | −250 ps/nm | 0 ps/nm | 0 ps/nm |
| | ⇩ | ⇩ | ⇩ | ⇩ |
| Residual dispersion value @ch20 (Maximum dispersion route) | 10 ps/nm | 226 ps/nm | 425 ps/nm | 85 ps/nm |

| Span | #1 | #2 | #3 | #4 |
|---|---|---|---|---|
| Transmission line dispersion value @ch20 | 81 ps/nm | 2.7 ps/nm | 5.4 ps/nm | 67.5 ps/nm |
| Dispersion compensation amount @ch20 | 0 ps/nm | +50 ps/nm | 0 ps/nm | 0 ps/nm |
| Residual dispersion target value @ch20 | 81 ps/nm | 52.7 ps/nm | 5.4 ps/nm | 67.5 ps/nm |

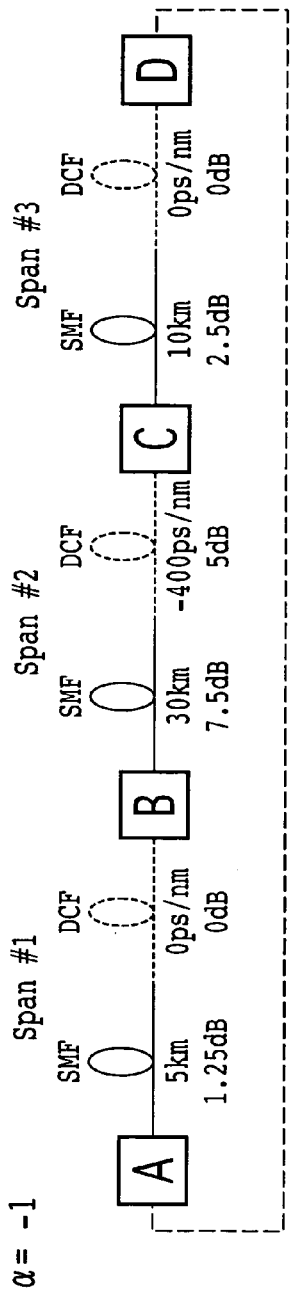
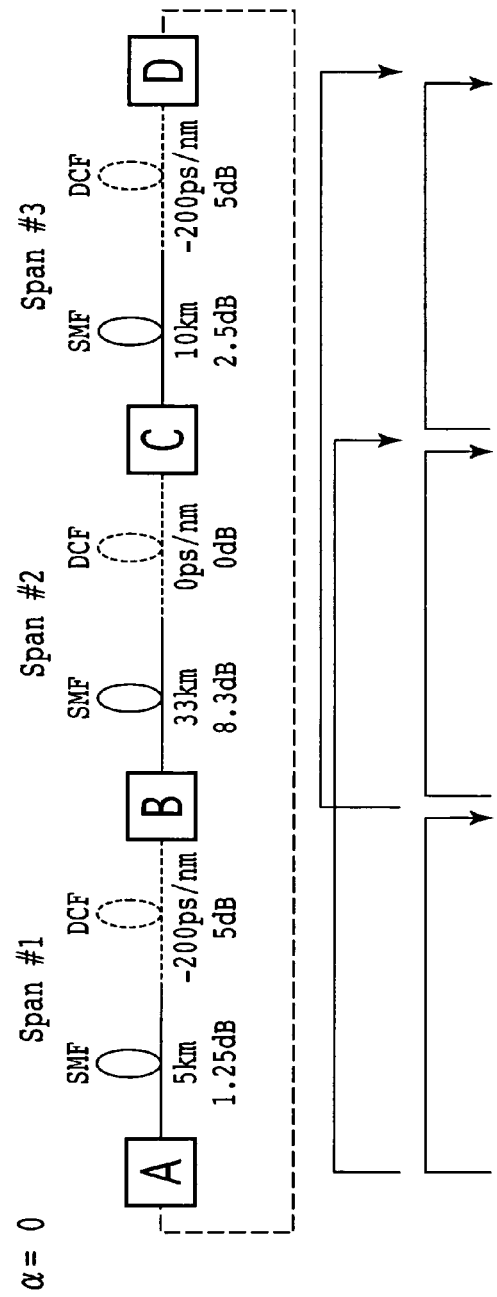
FIG.14A
FIG.14B

When α = -1

Δ = dispersion menu pitch

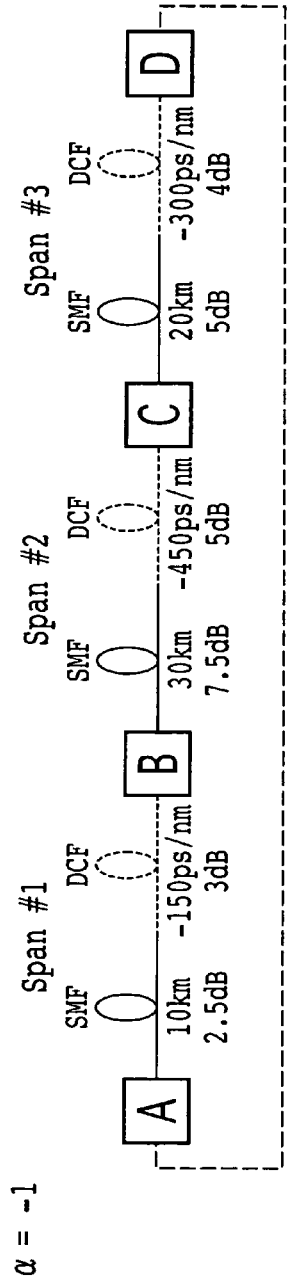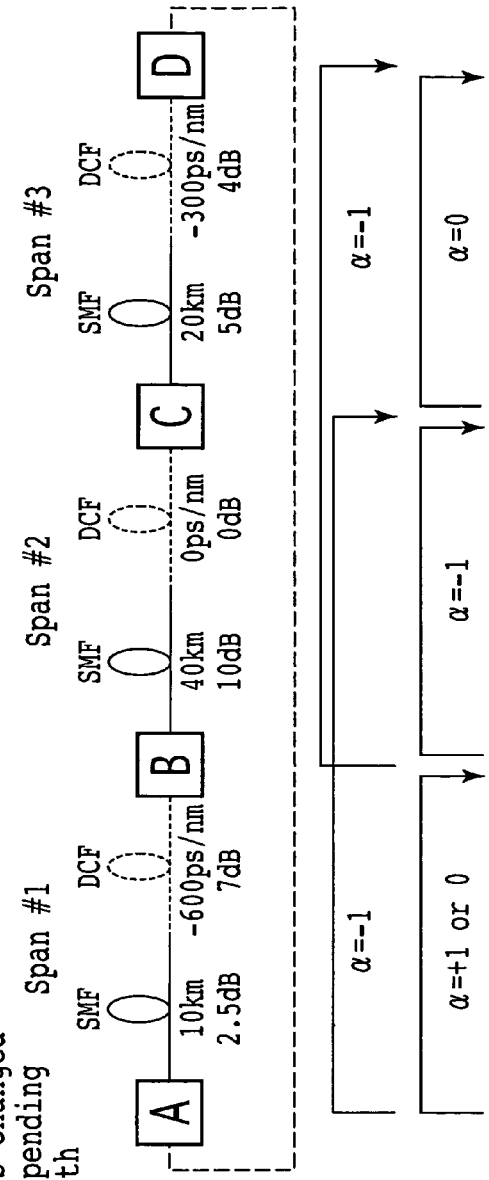

Dispersion compensation locations

Only routes whose start point is node A are shown

FIG.33

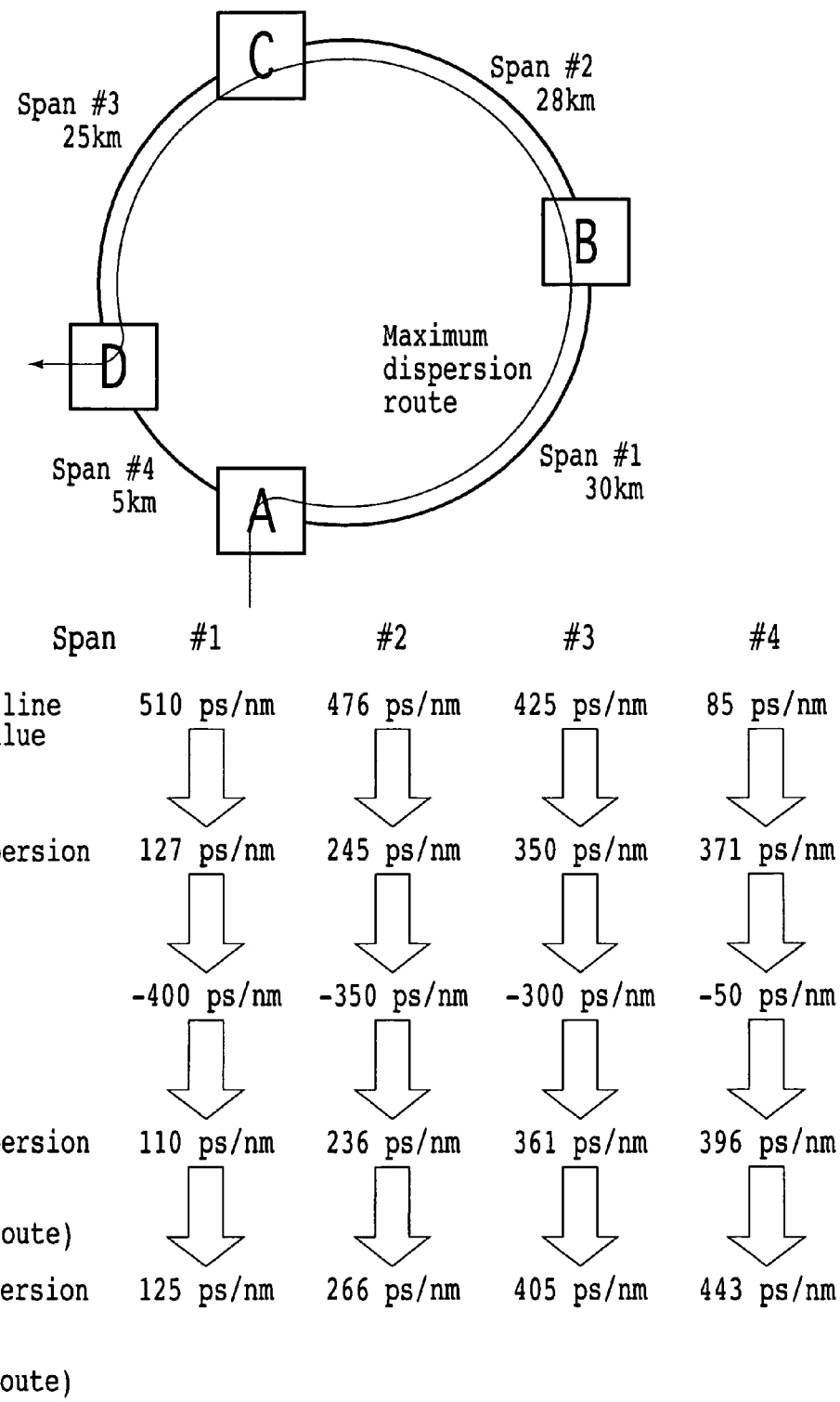

| Span | #1 | #2 | #3 | #4 |
|---|---|---|---|---|
| Transmission line dispersion value @ch20 | 510 ps/nm | 476 ps/nm | 425 ps/nm | 85 ps/nm |
| Residual dispersion target value @ch20 | 127 ps/nm | 245 ps/nm | 350 ps/nm | 371 ps/nm |
| Dispersion compensation value @ch20 | −400 ps/nm | −350 ps/nm | −300 ps/nm | −50 ps/nm |
| Residual dispersion value @ch20 (maximum dispersion route) | 110 ps/nm | 236 ps/nm | 361 ps/nm | 396 ps/nm |
| Residual dispersion value @ch40 (maximum dispersion route) | 125 ps/nm | 266 ps/nm | 405 ps/nm | 443 ps/nm |

OPTICAL TRANSMISSION NETWORK, OPTICAL TRANSMISSION APPARATUS, DISPERSION COMPENSATOR ARRANGEMENT CALCULATION APPARATUS AND DISPERSION COMPENSATOR ARRANGEMENT CALCULATION METHOD

CROSS REFERENCE TO RELATED APPLICATIONS

This is a continuing application, filed under 35 U.S.C. §111(a), of International Application PCT/JP2003/005537, filed Apr. 30, 2003.

BACKGROUND OF THE INVENTION

1. Field of the Invention

This invention relates to a wavelength division multiplexing optical transmission network having an optical ADM function and including dispersion compensators selected by a dispersion compensation method.

2. Description of the Related Art

Increase of the capacity of a network is proceeding together with the increase of the communication traffic. Recently, not only in backbone networks, but also in metro networks and access networks, construction of an optical transmission network based on the wavelength division multiplexing technique is demanded. In order to construct a network having a higher degree of flexibility, an optical OADM function capable of passing therethrough, adding or dropping light in a unit of a wavelength at a node.

FIG. 25 is a view showing an optical ADM apparatus (hereinafter referred to as node) The optical ADM apparatus can pass therethrough, drop or add a wavelength division multiplexed signal. Some optical ADM apparatus can add or drop only a particular wavelength (ch), and some other optical ADM apparatus can add or drop an arbitrary wavelength or wavelengths for each wavelength. As seen in FIG. 25, each node generally includes a dropping receiver 2 for receiving a drop signal from a wavelength division multiplexed signal and an adding transmitter 6 for adding to a wavelength division multiplexed signal.

Generally, since an optical signal is not a signal of a completely single wavelength, it suffers from waveform dispersion by wavelength dispersion (time delay difference depending upon the wavelength) in an optical transmission line. In order to suppress the waveform dispersion, it is necessary to suitably compensate for the dispersion in the transmission line or each apparatus. A popular dispersion compensation method is a method of inserting a dispersion compensator having a dispersion of the opposite sign to that of the dispersion generated in the transmission line to cancel the transmission line dispersion. Various dispersion compensators have been proposed including those which use a grating, those which use an optical interferometer and those which use an optical fiber.

FIG. 26 is a view illustrating an image of a residual dispersion and a dispersion tolerance. The axis of abscissa indicates the transmission point, and the axis of ordinate indicates the residual dispersion value. FIG. 26 illustrates a manner wherein a dispersion compensator is disposed at each of necessary places (four places in FIG. 26) of the transmission points to perform dispersion compensation. The residual dispersion (RD) is obtained by subtracting the dispersion compensation amount from a dispersion value which is accumulated as a signal propagates. The dispersion tolerance indicates an allowable range of the residual dispersion within which the receiver satisfies a particular characteristic. A solid line indicates the accumulated dispersion value of the signal on the long wavelength side in the wavelength division multiplexed signal, and a broken line indicates the accumulated dispersion value of the signal on the short wavelength side. FIG. 26 shows a signal having a compensated so that the residual dispersion value at the center wavelength between the long wavelength and the short wavelength may be the center of the dispersion tolerance.

On the other hand, in an optical transmission network, chirp is generated in a transmission line by a nonlinear effect appearing in the transmission line (self phase modulation (SPM) wherein the refractive index of the fiber relies upon the light intensity or cross phase modulation XPM wherein the refractive index is varied by the signal intensity of another wavelength). Also when a modulator is driven at a high speed, chirp which is a phenomenon that the wavelength of light varies transiently appears. If this variation is great, then deterioration in wavelength is caused by the wavelength dispersion characteristic of the optical fiber.

The chirp $\alpha$ is given by the following expression (1):

$$\alpha = (\partial\phi/\partial t)/((1/2P) \times \partial P/\partial t) \quad (1)$$

where $\phi$ is the phase, P the optical power, and t the time.

Therefore, the target value of the dispersion tolerance or the residual dispersion strictly differs depending upon the number of spans and the span length. For example, the dispersion tolerance of a receiver varies depending upon the transmission rate, transmission distance, span number, fiber input power, dispersion compensator input power and so forth.

For example, the dispersion tolerance varies depending upon the chirp of the optical modulator like, when $\alpha=-1$, $-100$ to $+800$ ps/nm
when $\alpha=0$, $-600$ to $+600$ ps/nm
when $\alpha=+1$, $-800$ to $+100$ ps/nm FIG. 27 illustrates an example of the dispersion tolerance where the chirp is $-1$, 0 and 1.

It is to be noted, however, that the dispersion tolerance is that of a receiver when a modulation signal of the chirp $\alpha$ transmitted from a transmitter is not transmitted and hence does not undergo a nonlinear influence. It is to be noted that the value varies depending upon the characteristic and the transmission deterioration amount of a transmitter and a receiver. In this manner, the width of the dispersion tolerance and the absolute value of the width shift in response to the chirp.

Actually, also a dispersion value dispersion of the transmission line, a dispersion value dispersion of the dispersion compensator and so forth by the individual, temperature, secular change and so forth are involved, and also they are taken into consideration to decide whether or not the dispersion value falls within the dispersion tolerance.

FIG. 28 is a view illustrating a slope compensation rate which depends upon the specification characteristic of a dispersion compensator (DCF) constructed using a dispersion compensating fiber. When the slope compensation rate is 100%, also the residual dispersion value can be made constant over all channels of a band. On the other hand, where the slope compensation rate exceeds 100%, there is a tendency that the residual dispersion in those channels which are on the shorter wavelength side with respect to a channel of the center frequency (40 ch where the number of channels is 80 ch) increases. On the contrary, where the slope compensation rate becomes lower than 100%, the residual dispersion on the longer wavelength side with respect to the channel of the center frequency exhibits higher values. FIG. 26 illustrates the residual dispersion and the dispersion tolerance where the slope compensation rate is lower than 100%, and as a signal is transmitted, the residual dispersion value on the longer wavelength side exhibits an increase. Since it is generally difficult to achieve the slope compensation rate of 100%, the width between a maximum value and a minimum value of the residual dispersion value increases together with the transmission distance as seen in FIG. 26. As a factor other than the slope compensation rate, also, for example, the dispersion value dispersion of the transmission line or the dispersion compensator increases the width of the residual dispersion value. Accordingly, it is necessary to set the compensation amount of the dispersion compensator so that the target value of the residual dispersion may fall within a tolerance centered at an optimum value.

FIG. 29 is a view illustrating an example of path arrangement of a linear network constructed using an optical ADM apparatus. For simplified description, a model including four nodes is considered.

In the linear network, a path group wherein a node A is a start point: A→B, A→C, A→D, a path group wherein a node B is a start point: B→C, B→D, a path group wherein a node C is a start point: C→D, and a path group wherein a node D is a start point: none are available. It is necessary to perform dispersion compensation design so that the dispersion tolerance may be satisfied between the transmission and reception sides in order that a predetermined error rate may be obtained in all of the path groups. It is to be noted that, if it is known in advance that not all paths are used, then dispersion design should be performed with regard only to the paths to be used.

FIG. 30 is a view illustrating an example of path arrangement of a ring network constructed using an optical ADM apparatus. For simplified description, a model including four nodes is considered.

In the ring network, since a path for going round the ring network is not used, a path group wherein the node A is a start point: A→B, A→C, A→D, a path group wherein the node B is a start point: B→C, B→D, B→A, a path group wherein the node C is a start point: C→D, C→A, D→B, and a path group wherein the node D is a start point: D→A, D→B, D→C, are available (in FIG. 30, only those paths whose start point is the node A are shown). Thus, dispersion design should be performed with regard to all of the path groups mentioned similarly. Where a path for going round the ring network is used for testing or monitoring, paths

A→A, B→B, C→C, D→D are required in addition to those mentioned above.

FIG. 31 is a flow chart illustrating a conventional dispersion compensation method.

FIG. 32 is a view illustrating dispersion compensation of a linear network by the conventional dispersion compensation method. For simplified description, a case of the linear network of full nodes wherein:

single mode fiber (SMF);

C-band (wavelength: 1,530 to 1,570 nm);

maximum wavelength number: 40 waves;

dispersion coefficient of ch1: 16 ps/nm/km, dispersion compensating fiber coefficient: −77 ps/nm/km;

transmission line dispersion coefficient of ch20: 17 ps/nm/km, dispersion compensating fiber coefficient: −80 ps/nm/km;

transmission line dispersion coefficient of ch40: 18 ps/nm/km, dispersion compensating fiber coefficient: −83 ps/nm/km;

dispersion tolerance at each node: −100 to +800 (when the chirp is −1);

RD target at last node: center of dispersion tolerance or residual dispersion optimum value;

RD target at intermediate node: distributed in proportion to transmission line dispersion value; and dispersion compensation pitch: $\Delta=50$ ps/nm is considered. In the present example, a dispersion of dispersion values is not taken into consideration for the simplified description.

It is assumed that, in the present linear network, a span #1 (route A, B) is 35 km; another span #2 (route B, C) is 5 km; and a further span #3 (route C, D) is 10 km.

A necessary dispersion compensation amount is calculated based on the center ch (ch20).

(1) At step S2, an average dispersion value of each span is calculated.

Dispersion value of the span #1=17×35=595 [ps/nm]

Dispersion value of the span #2=17×5=85 [ps/nm]

Dispersion value of the span #3=17×10=170 [ps/nm]

(2) At step S4, it is decided whether or not the residual dispersion values (RD) of all of the routes satisfy the dispersion tolerance.

For example, since a route having a maximum dispersion is the route which passes the spans #1, #2 and #3, the accumulated dispersion value of the route is ch80= 18× (35+5+10)=900 [ps/nm] and does not satisfy the dispersion tolerance.

(3) At step S6, a maximum dispersion route is detected.

The route having a maximum dispersion value is the route which passes the nodes A, B, C and D.

(4) At step S8, a residual dispersion target value is set.

For example, the center 350 ps/nm of the dispersion tolerance −100 to +800 ps/nm at the last node of the route which has the maximum residual dispersion value is set as the residual dispersion target value.

The residual dispersion optimum value is distributed in proportion to the transmission line dispersion value of each span. In particular:

Residual dispersion optimum value of the span #1= 350×(17×35)/(17×(35+5+10))=245 [ps/nm]

Residual dispersion target value of the span #2= 350×(17×5)/(17×(35+5+10))+245=280 [ps/nm]

Residual dispersion target value of the span #3= 350×(17×10)/(17×(35+5+10))+280=350 [ps/nm]

At this time, the residual dispersion target values at the intermediate nodes satisfy the dispersion tolerance −100 to +800 ps/nm.

(5) At step S10, the accumulated residual dispersion value−residual dispersion target value is calculated as a dispersion compensation amount at each span. In particular:

(Accumulated residual dispersion value−residual dispersion target value) at the span #1=17×35−245= 350 [ps/nm]

A dispersion compensation amount of −350 ps/nm is required

Residual dispersion amount after the dispersion compensation at $ch20=17\times35-350=245$ [ps/nm]

Residual dispersion amount after the dispersion compensation at $ch40=18\times35-350\times83/80=279$ [ps/nm]

(Accumulated residual dispersion value−residual dispersion target value) at the span #2= (245+17×5)−280=50 [ps/nm]

The dispersion compensation amount of −50 ps/nm is required

Residual dispersion amount after the dispersion compensation at $ch20=(245+17\times5)-50=280$ [ps/nm]

Residual dispersion amount after the dispersion compensation at $ch40=(279+18\times5)-50\times83/80=317$ [ps/nm]

(Accumulated residual dispersion value−residual dispersion target value) at the span #3= (280+17×10)−350=100 [ps/nm]

The dispersion compensation amount of −100 ps/nm is required.

Residual dispersion amount after the dispersion compensation at $ch20=(280+17\times10)-100=350$ [ps/nm]

Residual dispersion amount after the dispersion compensation at $ch40=(317+18\times10)-100\times83/80=$ 393 [ps/nm]

(6) At step S12, it is discriminated whether or not the residual dispersion values of all routes satisfy the dispersion tolerance. If the dispersion tolerance is satisfied, then the processing advances to step S14. However, if the dispersion tolerance is not satisfied by some of the residual dispersion values, then the processing advances to step S16. At step S14, the dispersion compensation amount selection is ended. At step S16, it is discriminated that selection of a dispersion compensation value is impossible.

Here, if the remaining dispersion value is calculated also with regard to the ch1 similarly as in (5) above, then since the residual dispersion values of all of the routes satisfy the dispersion tolerance, the dispersion compensation amount selection is ended.

From the foregoing, according to the conventional method, the dispersion compensation amounts of −350, −50 and −100 [ps/nm] are required for the spans #1, #2 and #3, respectively.

Now, dispersion compensation for a ring network is described. For simplified description, a ring network including totaling four nodes is considered. Same requisites as those of the linear network described hereinabove are used.

FIG. 33 is a view illustrating dispersion compensation of a ring network. The ring network includes a span #1 (route A, B) of 30 km, another span #2 (route B, C) of 28 km, a further span #3 (route C, D) of 25 km, and a still further span #4 (route D, A) of 5 km.

(1) First, an average dispersion value of each of the spans #1, #2, #3 and #4 is calculated.

Dispersion value of the span #1=17×30=510 [ps/nm]

Dispersion value of the span #2=17×28=476 [ps/nm]

Dispersion value of the span #3=17×25=425 [ps/nm]

Dispersion value of the span #4=17×5=85 [ps/nm]

(2) It is decided whether or not the residual dispersion values of all of the routes satisfy the dispersion tolerance.

For example, the accumulated dispersion value of the maximum dispersion route at ch40=18×(30+28+25+5)=1, 584 [ps/nm], and this does not satisfy the dispersion tolerance.

(3) A maximum dispersion route is detected. The route having a maximum dispersion value is the route which passes the nodes A, B, C and D excepting the span #4 which is a minimum dispersion span in the ring.

(4) The center 350 ps/nm of the dispersion tolerance −100 to +800 ps/nm at the last node D of the maximum dispersion route is set as the residual dispersion optimum value. The residual dispersion optimum value is distributed in proportion to the transmission line dispersion value of each span. In particular:

Residual dispersion target value at $ch20$ of the span #1=350×(17×30)/(17×(30+28+25))=127 [ps/nm]

Residual dispersion target value at $ch20$ of the span #2=350×(17×28)/(17×(30+28+25))+127= 245 [ps/nm]

Residual dispersion target value at $ch20$ of the span #3=350×(17×25)/(17×(30+28+25))+245= 350 [ps/nm]

Residual dispersion target value at $ch20$ of the span #4=350×(17×5)/(17×(30+28+25))+350= 371 [ps/nm]

(5) Then, the dispersion compensation amounts are determined from the accumulated residual dispersion value.

(Accumulated residual dispersion value−residual dispersion target value) at the span #1=17×30−127= 383 [ps/nm]

The dispersion compensation amount of −383 ps/nm is required (since the pitch Δ=−50 [ps/nm], −400 ps/nm nearest to −383 is used).

Residual dispersion amount after the dispersion compensation at $ch20=17\times30-400=110$ [ps/nm]

Residual dispersion amount after the dispersion compensation at $ch40=18\times30-400\times83/80=125$ [ps/nm]

(Accumulated residual dispersion value−residual dispersion target value) at the span #2= (110+17×28)−245=341 [ps/nm]

The dispersion compensation amount of −341 ps/nm is required (−350 ps/nm nearest to −341 is used)

Residual dispersion amount after the dispersion compensation at $ch20=(110+17\times28)-350=236$ [ps/nm]

Residual dispersion amount after the dispersion compensation at $ch40=(125+18\times28)-350\times83/80=$ 266 [ps/nm]

(Accumulated residual dispersion value−residual dispersion target value) at the span #3 = (236+17×25)−350=311 [ps/nm]

The dispersion compensation amount of −311 ps/nm is required (−300 ps/nm nearest to −311 is used).

Residual dispersion amount after the dispersion compensation at $ch20=(236+17\times25)-300=361$ [ps/nm]

Residual dispersion amount after the dispersion compensation at $ch40=(266+18\times25)-300\times83/80=405$ [ps/nm]

(Accumulated residual dispersion value−residual dispersion target value) at the span #4 = $(361+17\times5)-371=75$ [ps/nm]

The dispersion compensation amount of −75 ps/nm is required (−50 ps/nm nearest to −75 is used, although −100 ps/nm may be used, the lower value one is used).

Residual dispersion amount after the dispersion compensation at $ch20=(361+17\times5)-50=396$ [ps/nm]

Residual dispersion amount after the dispersion compensation at $ch40=(405+18\times5)-50\times83/80=443$ [ps/nm]

(6) The accumulated residual dispersion values of all routes satisfy the dispersion tolerance.

From the foregoing, according to the conventional method, the dispersion compensation amounts of −400, −350, −300 and −50 [ps/nm] are required for the spans #1, #2, #3 and #4, respectively.

However, in the optical transmission system, since a target value for a residual dispersion value is determined and dispersion compensation is performed so that the residual dispersion value may approach the target value, a great dispersion compensation amount and a great number of dispersion compensators are required. That a great dispersion compensation amount is required gives rise to a disadvantage that the loss at the dispersion compensations increases as much, and in order to compensate for the loss, use of an amplifier having a high optical power is required. Further, that a great number of dispersion compensators are required gives rise to a problem that the an increased investment cost is required.

SUMMARY OF THE INVENTION

It is an object of the present invention to provide an optical transmission network, an optical transmission apparatus and a dispersion compensator arrangement calculation apparatus which can reduce the dispersion compensation amount and the number of dispersion compensators.

According to an aspect of the present invention, there is provided an optical transmission network, comprising a first dispersion compensator arranged in a maximum dispersion span having a maximum dispersion value and searched out from within a maximum dispersion route having a maximum dispersion value from among routes of non-regeneration intervals within which a dispersion value before dispersion compensation does not satisfy an upper limit of a dispersion tolerance, and a second dispersion compensator arranged in a maximum dispersion span having a maximum dispersion value and searched out from within a maximum dispersion route having a maximum dispersion value from among the routes when a dispersion compensator is successively arranged until a route of a non-regeneration interval which does not satisfy the dispersion tolerance does not remain any more based on the dispersion value after the dispersion compensation with respect to the searched out maximum dispersion span. The dispersion compensation amounts of the first and second dispersion compensators are such that, when the dispersion compensation amount of the maximum dispersion span in which the first and second dispersion compensators are arranged is successively increased, the span has a residual dispersion value equal to or higher than a fixed range and the maximum dispersion route which relates to the spans has a residual dispersion value which satisfies the dispersion tolerance or the span has a residual dispersion value which is within the fixed range.

According to another aspect of the present invention, there is provided a dispersion compensator arrangement calculation apparatus for arranging dispersion compensators in an optical transmission network, comprising a span dispersion value calculation section for calculating a dispersion value of each span, a maximum dispersion route detection section for detecting, from among routes of non-regeneration intervals each having a dispersion value which does not satisfy an upper limit of a dispersion tolerance, a maximum dispersion route having a maximum dispersion value based on dispersion values after dispersion compensation with regard to those spans whose dispersion compensation amount is calculated already and dispersion values calculated by the span dispersion value calculation section with regard to the other spans, a maximum dispersion span detection section for detecting a maximum dispersion span in the maximum dispersion route, a dispersion tolerance decision section for deciding, when the maximum dispersion span is dispersion compensated with a first dispersion compensation amount, whether or not a residual dispersion value after the dispersion compensation of the maximum dispersion route is within the dispersion tolerance, and a dispersion compensation amount calculation section for calculating, when the residual dispersion value by the dispersion compensation amount of the maximum dispersion span is equal to or higher than a fixed range and the dispersion compensation amount is the first dispersion compensation amount, the dispersion compensation amount when it is decided by the dispersion tolerance decision section that the residual dispersion value is within the dispersion tolerance or a dispersion compensation amount with which the residual dispersion amount remains within the fixed range, the maximum dispersion route detection, dispersion tolerance decision section and dispersion compensation amount calculation section repetitively performing respective processing until after a route of a non-regeneration interval which does not satisfy the dispersion tolerance remains any more.

The above and other objects, features and advantages of the present invention and the manner of realizing them will become more apparent, and the invention itself will best be understood from a study of the following description and appended claims with reference to the attached drawings showing some preferred embodiments of the present invention.

BRIEF DESCRIPTION OF THE DRAWINGS

FIG. 14A is a view showing an optical transmission network according to a sixth embodiment of the present invention;

FIG. 14B is a view showing the optical transmission network according to the sixth embodiment of the present invention;

FIG. 23A is a view showing an optical transmission network according to a thirteenth embodiment of the present invention;

FIG. 23B is a view showing the optical transmission network according to the thirteenth embodiment of the present invention;

FIG. 33 is a view illustrating an example of dispersion compensator arrangement calculation for a conventional ring network.

DETAILED DESCRIPTION OF THE PREFERRED EMBODIMENTS

Figure 1:
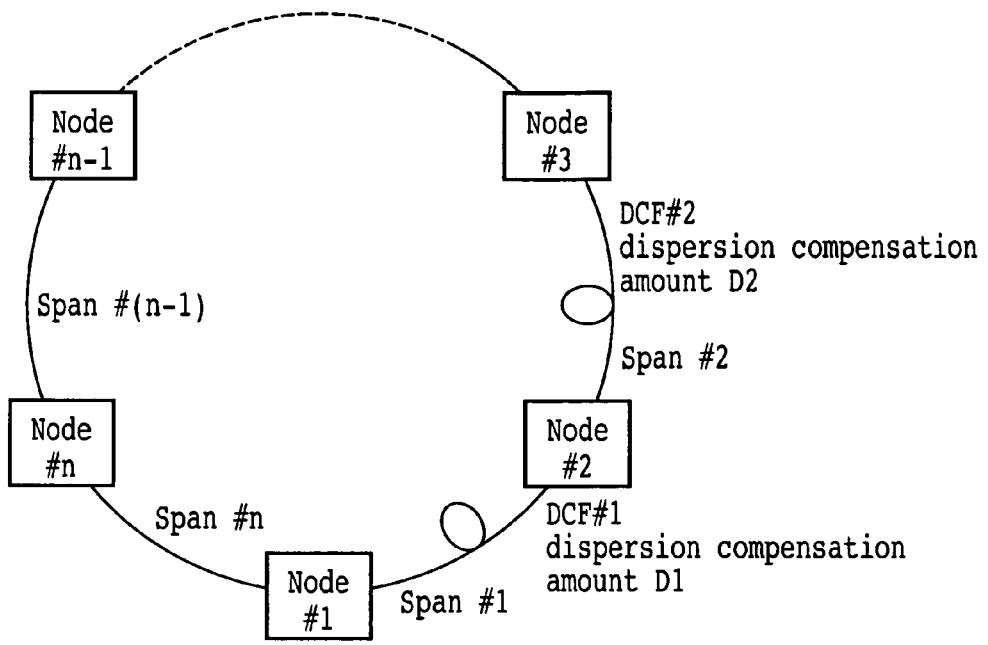
FIG. 1 is a view illustrating a principle of the present invention.

Before embodiments of the present invention are described, a principle of the present invention is described. FIG. 1 is a view illustrating the principle of the present invention and shows an optical transmission network according to the principle of the present invention. Referring to FIG. 1, the optical transmission network shown is formed as a ring network from n nodes #1 to #n. The span between the node #i and the node #(i+1) (i=1, ..., n−1) is referred to as span #i, and the span between the node #n and the node #1 is referred to as span #n. Here, it is assumed that, for the simplified description, the dispersion value of the span #(i+1)≦span i (i=1, 2, ..., n−1).

It is assumed that the span #i (i=1, 2, ..., n) is a non-regeneration interval. The maximum dispersion route is a route which passes the nodes #1, #2, ..., #n, and a dispersion compensator DCF#1 of a dispersion compensation amount D1 is arranged in the maximum dispersion span #1 in the route. The dispersion compensation amount D1 is (i) a dispersion compensation amount with which, when dispersion compensation is performed in a pitch Δ for the span #1, the residual dispersion value becomes equal to or lower than a threshold value or (ii) a dispersion compensation amount with which, where all of the routes satisfy the dispersion tolerance, the absolute value of the dispersion compensation amount which satisfies the dispersion tolerance exhibits a minimum value.

If the dispersion tolerance is not satisfied even if dispersion compensation is performed for the maximum dispersion span #1, a dispersion compensator DCF#2 having a dispersion amount D2 is arranged in the maximum dispersion span #2 of the maximum dispersion route whose dispersion value is the residual dispersion of the maximum dispersion span #1. The dispersion compensation amount D2 satisfies the condition (i) or (ii) described above when the dispersion compensation is successively performed in the pitch α for the span #2. Thereafter, similar calculation is performed until the calculation is completed for all routes or the dispersion tolerance is satisfied, and a dispersion compensator having a dispersion compensation amount obtained by a result of such calculation is arranged in the pertaining span. Since necessary but minimum dispersion compensation is performed for a maximum dispersion span of a maximum dispersion route, the dispersion compensation amount of the entire network is minimized and also the number of necessary dispersion compensators is minimized.

First Embodiment

Figure 2:
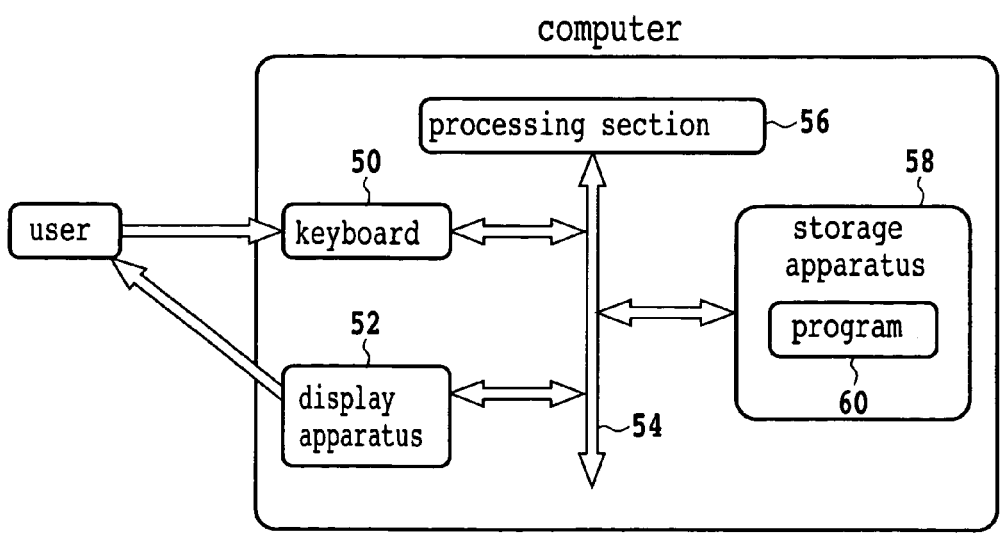
FIG. 2 is a block diagram showing a dispersion compensator arrangement calculation apparatus according to an embodiment of the present invention.

FIG. 2 is a block diagram of a dispersion compensator arrangement calculation apparatus of an optical transmission network according to an embodiment of the present invention. Referring to FIG. 2, the dispersion compensator arrangement calculation apparatus includes a keyboard 50, a display apparatus 52, a bus 54, a processing section 56 and a storage apparatus 58. The keyboard 50 is an inputting apparatus for inputting design parameters for an optical transmission network and so forth. The design parameters include those of information relating to routes to be used, information relating to spans, information relating to transmission lines, information relating to dispersion compensators and information relating to dispersion tolerances. The information relating to routes to be used is path information of paths of the optical transmission network to be used. The information relating to spans is transmission distances of the spans. The information relating to transmission lines is transmission line dispersion coefficients at a maximum wavelength, a minimum wavelength and a center wavelength. The information relating to dispersion compensators is dispersion compensator dispersion coefficients at the maximum wavelength, minimum wavelength and center wavelength. For example, where a dispersion compensating fiber is used for the dispersion compensators, the information relating to dispersion compensators is dispersion compensating fiber dispersion coefficients. The information relating to dispersion tolerances is dispersion tolerances and chirp values.

The display apparatus 52 outputs a result of dispersion compensator arrangement calculation of the optical network. The result of dispersion compensator arrangement calculation is a span in which a dispersion compensator is arranged and a dispersion compensation amount in the span. The bus 54 interconnects the processing section 56 to the keyboard 50, display apparatus 52 and storage apparatus 58. The processing section 56 is a CPU which executes a program 60. The storage apparatus 58 is a storage medium in which the program 60 and so forth are stored.

Figure 3:
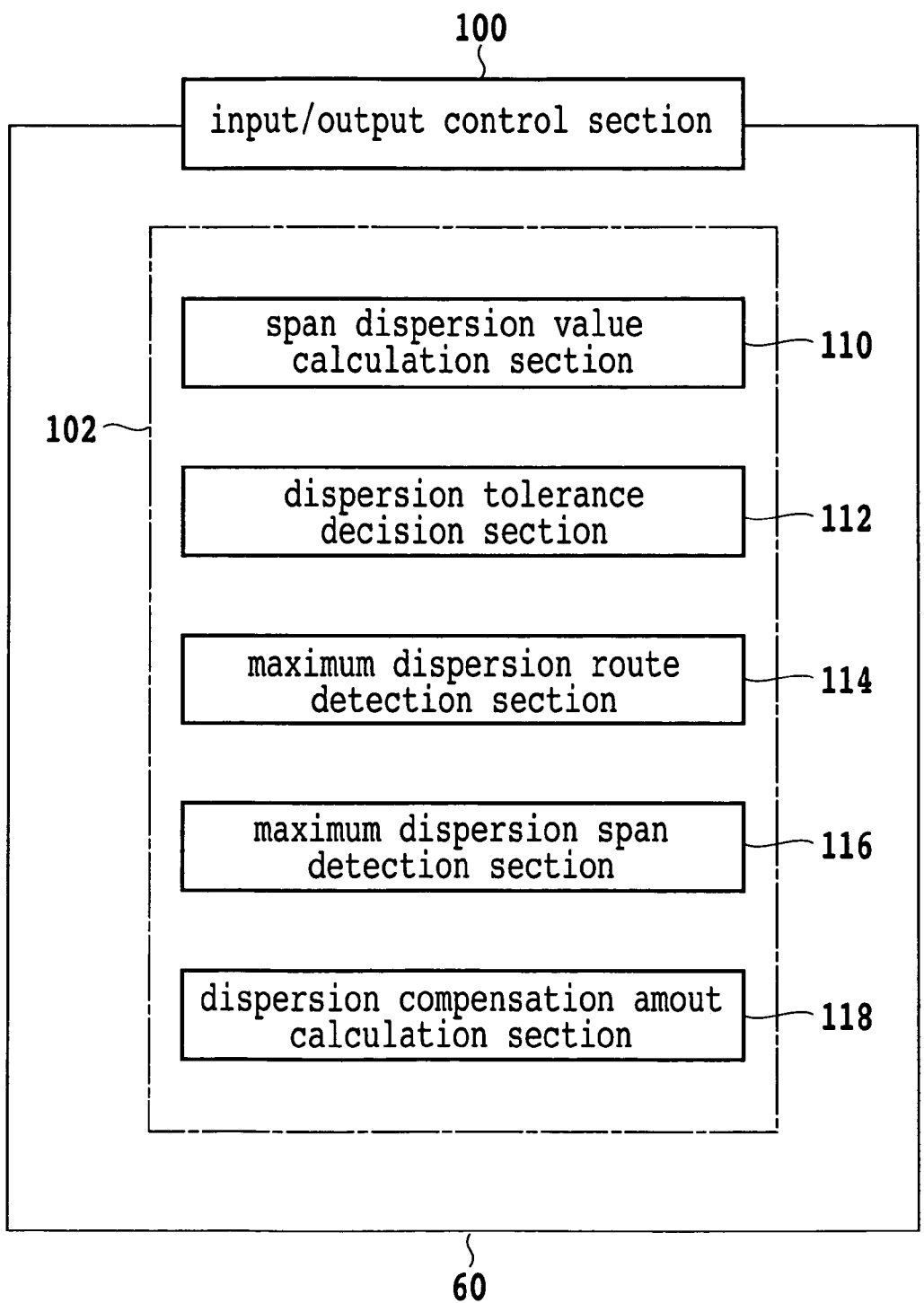
FIG. 3 is a functional block diagram of a program illustrated in FIG. 2.

FIG. 3 is a functional block diagram of the program 60 shown in FIG. 2. Referring to FIG. 3, the program 60 includes an input/output control section 100 and a dispersion compensator arrangement calculation section 102. The input/output control section 100 causes the display apparatus 52 to display an input of a design parameter or the like for the optical network from the keyboard 50 and a result of dispersion compensator arrangement calculation. The dispersion compensator arrangement calculation section 102 includes a span dispersion value calculation section 110, a dispersion tolerance decision section 112, a maximum dispersion route detection section 114, a maximum dispersion span detection section 116 and a dispersion compensation amount calculation section 118.

Figure 4:
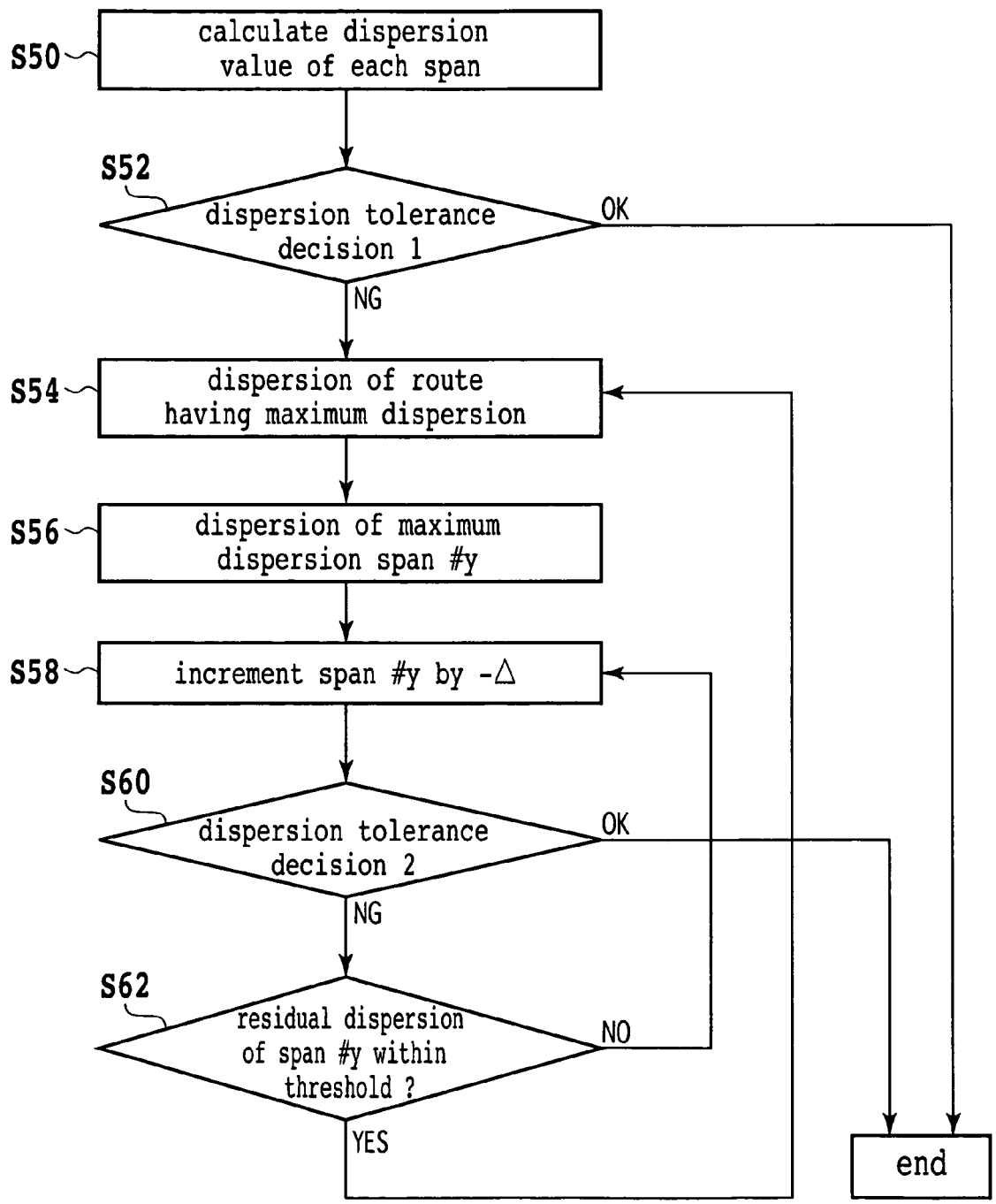
FIG. 4 is a flow chart of dispersion compensator arrangement calculation by a first embodiment of the present invention.

FIG. 4 is a flow chart of the dispersion compensator arrangement calculation section 102 shown in FIG. 3. The procedure illustrated in FIG. 4 is hereinafter described in detail in connection with a particular example. The span dispersion value calculation section 110 calculates the dispersion value of each span at step S50. The dispersion tolerance decision section 112 discriminates in dispersion tolerance decisions 1 and 2 at steps S52 and S60 whether or not all routes satisfy a dispersion tolerance. The maximum dispersion route detection section 114 detects a route having a maximum dispersion at step S54. At this time, for a span in which a dispersion compensator is arranged, a dispersion value after the dispersion compensation is used.

The maximum dispersion span detection section 116 detects dispersion spans in a maximum dispersion route at step S56. The dispersion compensation amount calculation section 118 calculates (i) a dispersion compensation amount with which, when a dispersion compensation amount of $-\Delta$ is successively added to the maximum dispersion span indicated at step S58 or S62, the residual dispersion value becomes equal to or lower than a threshold value or (ii) a dispersion compensation amount with which, where all of the routes satisfy the dispersion tolerance, the absolute value of the dispersion compensation amount which satisfies the dispersion tolerance exhibits a minimum value.

Figure 5:
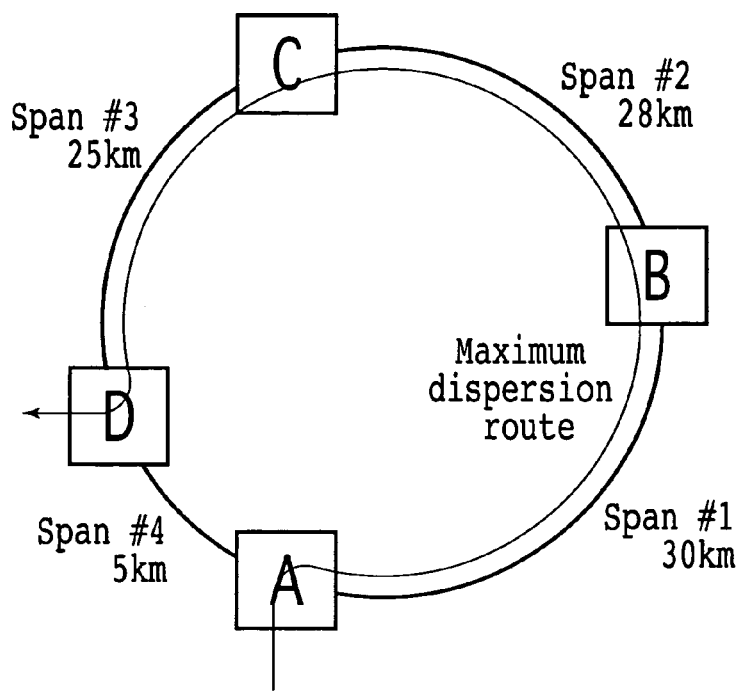
FIG. 5 is a view showing an optical transmission network according to the first embodiment of the present invention.

FIG. 5 is a view showing an optical transmission network according to a first embodiment of the present invention. In FIG. 5, for the simplified description, a ring network including totaling four nodes is shown. Arrangement of dispersion compensators and dispersion compensation amount calculation of the ring network are performed automatically by the dispersion compensator arrangement calculation apparatus described hereinabove with reference to FIG. 2 or manually in accordance with the flow chart shown in FIG. 4. Such prerequisites for parameters of the optical network as given below are used:

SMF (single mode fiber);
maximum wavelength number: 40 waves;
transmission line dispersion coefficient of ch1: 16 ps/nm/km, dispersion compensating fiber dispersion coefficient: −77 ps/nm/km (a dispersion compensator other than a dispersion compensating fiber may be used. In this instance, a dispersion compensation value (ps/nm) is used)
transmission line dispersion coefficient of ch20: 17 ps/nm/km, dispersion compensating fiber dispersion coefficient: −80 ps/nm/km;
transmission line dispersion coefficient of ch40: 18 ps/nm/km, dispersion compensating fiber dispersion coefficient: −83 ps/nm/km;
dispersion tolerance at each node: −100 to +800 ps/nm (chirp: −1) (While, in the present example, the case wherein the chirp is −1 is taken as an example, any other chirp may be used. The dispersion tolerance may be different from the nodes in accordance with the capability of the receiver of the each node.);
dispersion compensation pitch: $\Delta$=50 ps/nm
span #1 of the route of the nodes A, B: 30 km
span #2 of the route of the nodes B, C: 28 km
span #3 of the route of the nodes C, D: 25 km
span #4 of the route of the nodes D, A: 5 km In the present example, a dispersion of any other than the transmission line is not taken into consideration.

(1) At step S50, an average dispersion value of each of the spans is calculated.

Dispersion value of the span #1=17×30=510 [ps/nm]

Dispersion value of the span #2=17×28=476 [ps/nm]

Dispersion value of the span #3=17×25=425 [ps/nm]

Dispersion value of the span #4=17×5=85 [ps/nm]

(2) At step S52, it is decided whether or not the residual dispersion values of all of the routes satisfy the dispersion tolerance (dispersion tolerance decision 1). If the accumulated residual dispersion values of all of the routes satisfy the dispersion tolerance, the processing is ended. If the dispersion tolerance is not satisfied by the accumulated residual dispersion value of some route, then the processing advances to step S54.

For example, the accumulated dispersion value of the maximum dispersion route at ch40=18×(30+28+25)=1,494 [ps/nm], and this does not satisfy the dispersion tolerance. Therefore, the processing advances to step S54. It is to be noted that, also where a dispersion tolerance is set for each node, it is decided whether or not the dispersion tolerances are satisfied by all of the routes.

(3) At step S54, a maximum dispersion route is detected.

The route having a maximum dispersion value is the route which passes the spans #1, #2 and #3 excepting the span #4 which is a minimum dispersion span in the ring.

(4) At step S56, a maximum dispersion span #y in the maximum dispersion route is detected. From the paragraph (1) above, the maximum dispersion span is the span #1. Thus, a dispersion compensator is arranged in the maximum dispersion span in the maximum dispersion route. The dispersion amount of the dispersion compensator is calculated in the following manner.

(5) At step S58, the span #1 is incremented by a dispersion compensation amount of $-\Delta=-50$ [ps/nm]. The reason why a span is incremented by the dispersion compensation pitch $\Delta$ is that it is intended to decrease the number of types of dispersion compensators thereby to decrease the amount of stocked devices.

(6) At step S60, it is decided whether or not the residual dispersions of all of the routes satisfy the dispersion tolerance (dispersion tolerance decision 2). If the dispersion tolerance is satisfied, then the processing is ended. If the dispersion tolerance is not satisfied, then the processing advances to step S62.

For example, the accumulated dispersion value of the maximum dispersion route at ch40=18×(30+28+25)−50×83/80=1,442 [ps/nm], and this does not satisfy the dispersion tolerance.

(7) It is decided whether or not the residual dispersion of the maximum dispersion span #1 is within a fixed range, that is, within a threshold value. If the residual dispersion is within the threshold value, then the processing returns to step S54. If the residual dispersion is not within the threshold value, then the processing returns to step S58. The reason why the threshold value is provided is that, if the accumulated dispersion value is decreased without provision of a lower limit value to the residual dispersion, then there is the possibility that the accumulated dispersion value of the route may become lower than the lower limit of the dispersion tolerance.

For example, where the chirp is −1, the dispersion tolerance is −100 to +800 ps/nm and the absolute value of the lower limit is low, and therefore, the threshold value $\Delta$ is set to $0 \leq$(residual dispersion)$\leq \Delta$.

The residual dispersion at ch40 of the span #1=18×30−50×83/80=488 [ps/nm] and hence is outside the threshold value.

(8) Thereafter, the span #1 is selected as the maximum dispersion span and is successively incremented by $-\Delta$ similarly until all routes satisfy the dispersion tolerance.

(9) When the span #1 is incremented by −500 [ps/nm] in total, the accumulated dispersion value of the maximum dispersion route at ch40=18×(30+28+25)−500×83/80=975 [ps/nm], and this does not satisfy the dispersion tolerance. At this time, since $$\text{residual dispersion of the span } \#1 = 18 \times 30 - 500 \times 83/80 = 21 \text{ [ps/nm]}$$

the residual dispersion satisfies the condition that it is within the threshold value. It is to be noted that any other wavelength (ch) than the wavelength at ch40 may be used for the decision of the threshold value.

(10) A maximum dispersion route is searched again using, as the average dispersion value of the maximum dispersion span #1, an average dispersion value after the dispersion compensation. Since the average dispersion value of the span #1 is 10 [ps/nm] after the dispersion compensation, the maximum dispersion route is a route which passes the spans #2, #3 and #4.

Since $$\text{accumulated dispersion value of the route at } ch40 = 18\times(28+25+5)=1,044 \text{ [ps/nm]}$$

the span #2 of the maximum dispersion span is incremented by the dispersion compensation amount. If the span #2 is incremented by −250 [ps/nm], then the accumulated dispersion value of the route at ch40=18×(28+25+5)−250×83/80=785 [ps/nm]. Consequently, all routes satisfy the dispersion tolerance. It is to be noted that, in the present example, since it is apparent that the accumulated dispersion value of ch1 is in the positive, the decision of the lower limit value of the dispersion tolerance is omitted.

From the foregoing, in the ring network shown in FIG. 5, a dispersion compensator of a dispersion compensation amount of −500 [ps/nm] is arranged in the span #1, and another dispersion compensator of another dispersion compensation amount of −250 [ps/nm] is arranged in the span #2. In particular, since, in the conventional arrangement, the dispersion compensation amounts of −400, −350, −300 and −50 [ps/nm] are required for the spans #1, #2, #3 and #4, respectively, the totaling dispersion compensation amount can be reduced and also the number of dispersion compensators can be reduced from four to two.

Second Embodiment

Figure 6:
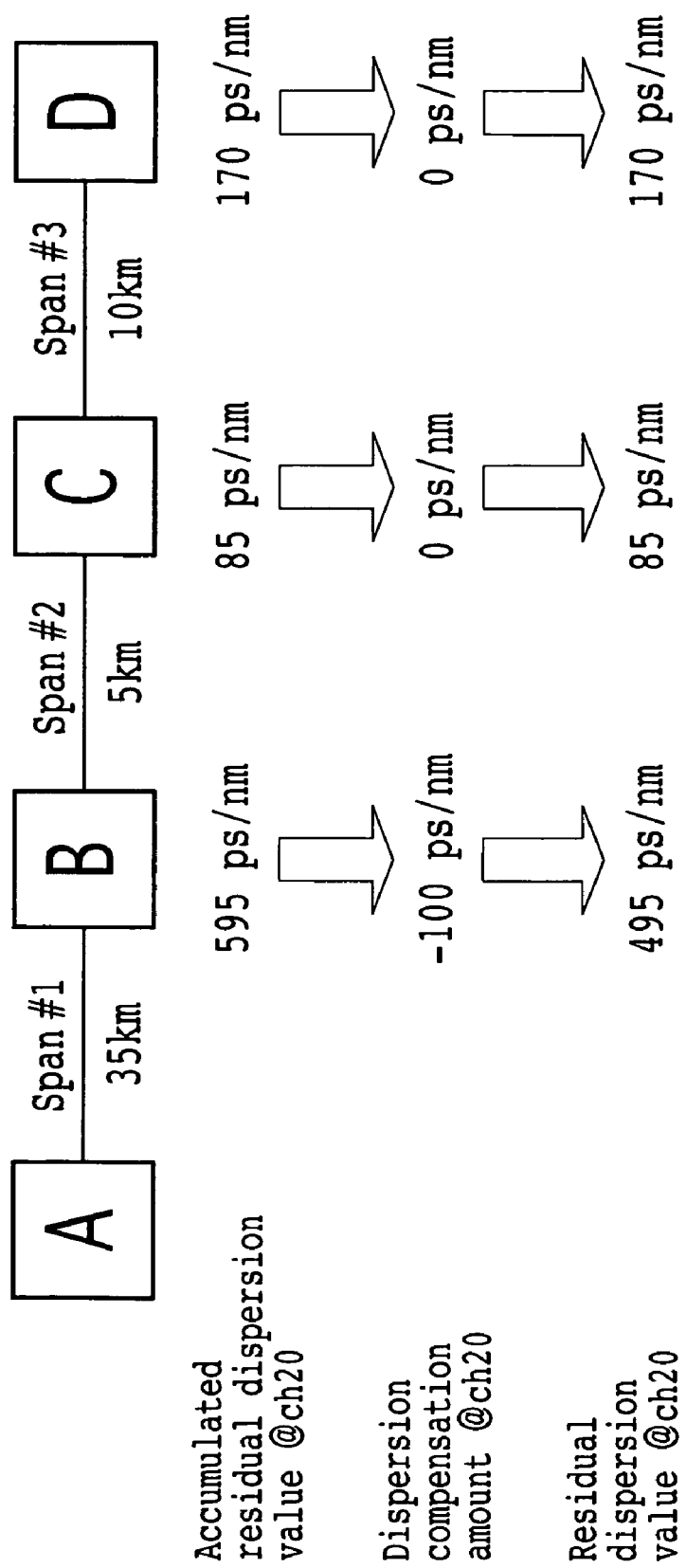
FIG. 6 is a view showing an optical transmission network according to a second embodiment of the present invention.

FIG. 6 is a view showing an optical transmission network according to a second embodiment of the present invention. In FIG. 6, for the simplified description, a linear network including totaling four nodes is shown. Here, such prerequisites for the optical network as given below are used:

SMF (single mode fiber);

C-band maximum wavelength number: 40 waves;

transmission line dispersion coefficient of ch1: 16 ps/nm/km, dispersion compensating fiber dispersion coefficient: −77 ps/nm/km (a dispersion compensator other than a dispersion compensating fiber may be used. In this instance, a dispersion compensation value (ps/nm) is used);

transmission line dispersion coefficient of ch20: 17 ps/nm/km, dispersion compensating fiber dispersion coefficient: −80 ps/nm/km;

transmission line dispersion coefficient of ch40: 18 ps/nm/km, dispersion compensating fiber dispersion coefficient: −83 ps/nm/km;

dispersion tolerance at each node: −100 to +800 [ps/nm] (chirp: −1) (While, in the present example, the case wherein the chirp is −1 is taken as an example, any other chirp may be used. The dispersion tolerance may be different from the nodes in accordance with the capability of the receiver of the each node.);

dispersion compensation pitch: $\Delta$=50 ps/nm span #1 of the route of the nodes A, B: 35 km span #2 of the route of the nodes B, C: 5 km span #3 of the route of the nodes C, D: 10 km Here, a dispersion of any other than the transmission line is ignored.

(1) At step S50, an average dispersion value of each of the spans is calculated.

Dispersion value of the span #1=17×35=595 [ps/nm]

Dispersion value of the span #2=17×5=85 [ps/nm]

Dispersion value of the span #3=17×10=170 [ps/nm]

(2) At step S52, it is decided whether or not the residual dispersion values of all of the routes satisfy the dispersion tolerance (dispersion tolerance decision 1). If the residual dispersion values of all of the routes satisfy the dispersion tolerance, the processing is ended. If the dispersion tolerance is not satisfied by the residual dispersion value of some route, then the processing advances to step S54.

For example, the accumulated dispersion value of the maximum dispersion route at ch40=18×(35+5+10)= 900 [ps/nm], and this does not satisfy the dispersion tolerance. Therefore, the processing advances to step S54.

(3) At step S54, a maximum dispersion route is detected.

The route having a maximum residual dispersion value is the route which passes the spans #1, #2 and #3.

(4) At step S56, a maximum dispersion span #y in the maximum dispersion route is detected. From the paragraph (1) above, the maximum dispersion span is the span #1. Thus, a dispersion compensator is arranged in the maximum dispersion span in the maximum dispersion route. The dispersion amount of the dispersion compensator is calculated in the following manner.

(5) At step S58, the span #1 is incremented by a dispersion compensation amount of $-\Delta=-50$ [ps/nm].

(6) At step S60, it is decided whether or not the residual dispersions of all of the routes satisfy the dispersion tolerance (dispersion tolerance decision 2). If the dispersion tolerance is satisfied, then the processing is ended. If the dispersion tolerance is not satisfied, then the processing advances to step S62.

For example, the accumulated dispersion value of the maximum dispersion route at ch40=18×(35+5+10)− 50×83/80=848 [ps/nm], and this does not satisfy the dispersion tolerance.

(7) It is decided at step S62 whether or not the residual dispersion of the maximum dispersion span #1 is within a threshold value. If the residual dispersion is within the threshold value, then the processing returns to step S54. If the residual dispersion is not within the threshold value, then the processing returns to step S58.

For example, since the chirp is −1, the threshold value $\Delta$ is set to $0 \leq$ (residual dispersion value) $\leq \Delta$. Since the residual dispersion at ch40 of the span #1=18×30−50×83/80=488 [ps/nm], this is outside the threshold value.

(8) Thereafter, the span #1 is selected as the maximum dispersion span and is successively incremented by $-\Delta$ similarly until all routes satisfy the dispersion tolerance.

(9) When the span #1 is incremented by −100 [ps/nm], the accumulated dispersion value of the maximum dispersion route at ch40=18×(35+5+10)−100×83/80=796 [ps/nm], and this satisfies the dispersion tolerance.

From the foregoing, in the linear network shown in FIG. 6, a dispersion compensation amount of −100 [ps/nm] is required for the span #1. In particular, since, in the conventional arrangement, the dispersion compensation amounts of −350, −50 and −100 [ps/nm] are required for the spans #1, #2 and #3, respectively, the totaling dispersion compensation amount can be reduced and also the number of dispersion compensators can be reduced from three to one.

Third Embodiment

Figure 7:
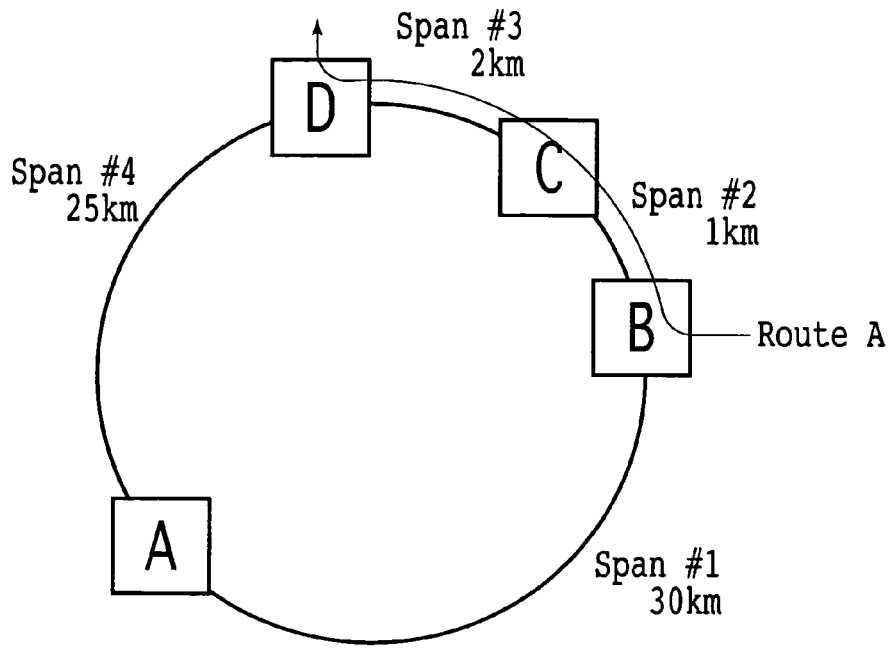
FIG. 7 is a view showing an optical transmission network according to a third embodiment of the present invention.

FIG. 7 is a view showing an optical transmission network according to a third embodiment of the present invention. Where a plurality of spans having a short propagation distance connect successively, or where the dispersion coefficient of the transmission line is low as in the case of a dispersion shift fiber or the like, or else where a part having a negative dispersion such as an optical coupler is used or in a like case, there is the possibility that the accumulated dispersion value may be lower than the lower limit of the dispersion tolerance. The present embodiment is ready also for such a case as just described. In FIG. 7, for the simplified description, a ring network including totaling four nodes is shown. Such prerequisites for parameters of the optical transmission network as given below are used:

DSF (dispersion shift fiber) (while here a DSF is taken as an example of a transmission line having a low transmission light dispersion coefficient, a different fiber may be used);

L-band maximum wavelength number: 40 waves;

transmission line dispersion coefficient of ch1: 1.6 ps/nm/km, dispersion compensating fiber dispersion coefficient: −85 ps/nm/km;

transmission line dispersion coefficient of ch20: 2.7 ps/nm/km, dispersion compensating fiber dispersion coefficient: −89 ps/nm/km;

transmission line dispersion coefficient of ch40: 3.8 ps/nm/km, dispersion compensating fiber dispersion coefficient: −93 ps/nm/km;

dispersion value in each node: −40 ps/nm upon passing of a node, −20 ps/nm upon adding/dropping at each node;

dispersion at spans: ±15 ps/nm (it strictly depends on the transmission distance or the number of spans)

dispersion tolerance at each node: −100 to +800 ps/nm (chirp 1)

dispersion compensation pitch: $\Delta$=50 ps/nm span #1 of the route of the nodes A, B: 30 km span #2 of the route of the nodes B, C: 1 km span #3 of the route of the nodes C, D: 2 km span #4 of the route of the nodes D, A: 25 km In the present example, a dispersion of any other than the transmission line is ignored.

Figure 8:
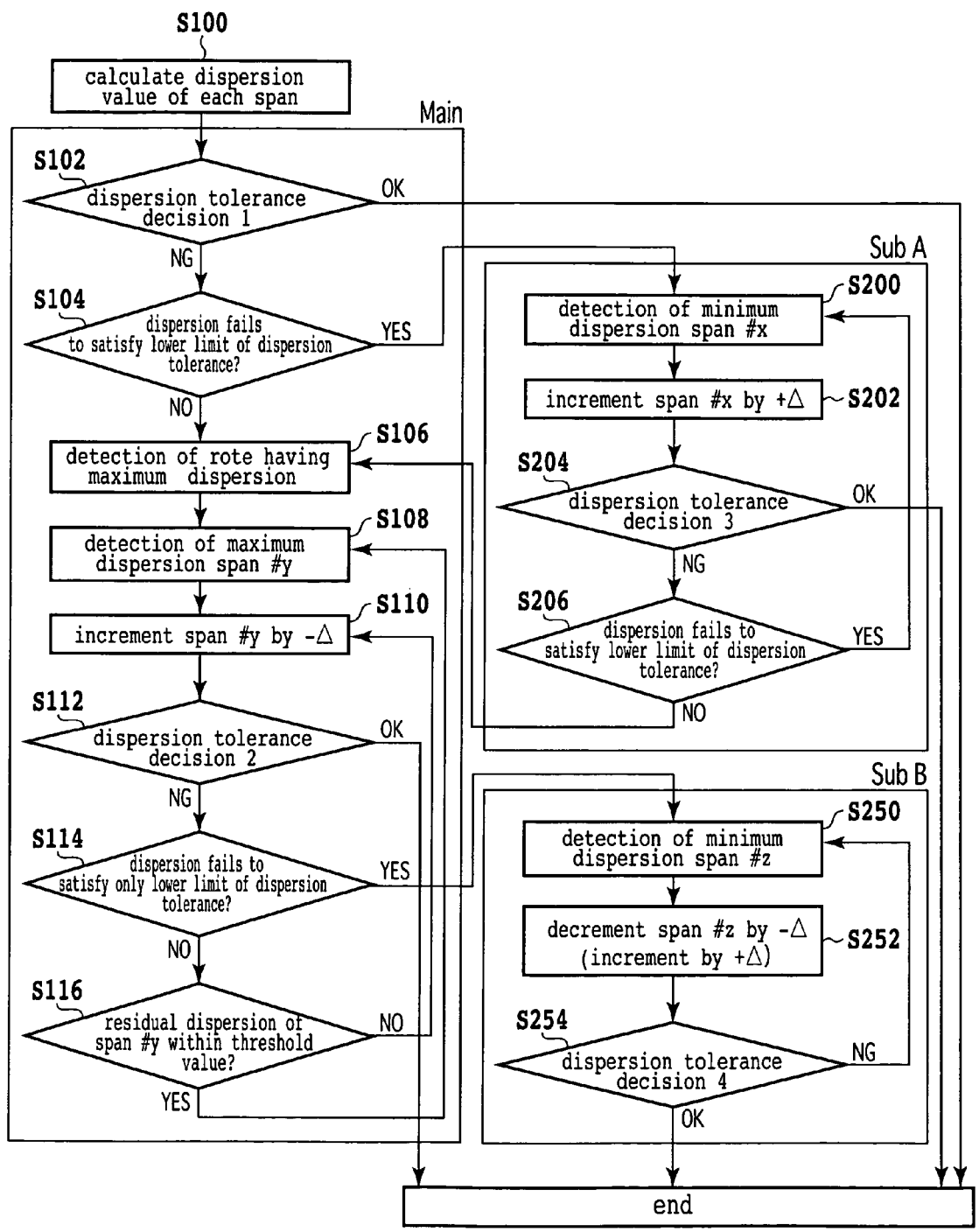
FIG. 8 is a flow chart of dispersion compensator arrangement calculation by the third-embodiment of the present invention.

FIG. 8 is a flow chart illustrating dispersion compensator arrangement calculation. The flow chart is designed so as to satisfy the lower limit of the dispersion tolerance, and in a Main flow at steps S102 to S116, it is discriminated at step S104 or S114 whether or not the lower limit of the dispersion tolerance is satisfied. Further, in a Sub A flow at steps S200 to S206 and a Sub B flow at steps S250 to S254, calculation for satisfying the lower limit of the dispersion tolerance is performed. Arrangement of dispersion compensators and dispersion compensation amount calculation of the ring network shown in FIG. 7 are performed automatically by a dispersion compensator arrangement calculation apparatus configured similarly to that described hereinabove with reference to FIG. 2 but including the program illustrated in the flow chart of FIG. 8 or manually in accordance with the flow chart shown in FIG. 8.

(1) At step S100, an average dispersion value of each of the spans is calculated.

Dispersion value of the span #1=2.7×30=81 [ps/nm]

Dispersion value of the span #2=2.7×1=2.7 [ps/nm]

Dispersion value of the span #3=2.7×2=5.4 [ps/nm]

Dispersion value of the span #4=2.7×25=67.5[ps/nm]

(2) At step S102, it is decided whether or not the residual dispersion values of all of the routes satisfy the dispersion tolerance (dispersion tolerance decision 1). If the accumulated residual dispersion values of all of the routes satisfy the dispersion tolerance, then the processing is ended. If the dispersion tolerance is not satisfied by the accumulated residual dispersion value of some route, then the processing advances to step S104.

The accumulated dispersion value at ch1 of the route A=1.6×(1+2)+(−40−20×2)+(−15×2)=−105.2 [ps/nm], and this does not satisfy the dispersion tolerance. Therefore, the processing advances to step S104.

(3) At step S104, it is decided whether or not the accumulated residual dispersion value of the route detected at step S104 fails to satisfy the lower limit of the dispersion tolerance. If the accumulated residual dispersion value of the route fails to satisfy the lower limit of the dispersion tolerance, then the processing advances to step S200. If the accumulated residual dispersion value of the route does not fail to satisfy the lower limit of the dispersion tolerance, then the processing advances to step S106.

For example, the accumulated dispersion value at ch1 of the route A=105.2 [ps/nm], and this fails to satisfy the lower limit of the dispersion tolerance. Therefore, the processing advances to step S200.

(4) At step S200, a minimum dispersion span #x is detected. From the paragraph (1) above, the minimum dispersion span #x is the span #2.

(5) At step S202, the span #2 is incremented by Δ= +50 [ps/nm].

(6) At step S204, it is decided whether or not the accumulated residual dispersions of all of the routes satisfy the dispersion tolerance (dispersion tolerance decision 3). If the accumulated residual dispersions of all of the routes satisfy the dispersion tolerance, then the processing is ended. If the dispersion tolerance is not satisfied by the accumulated residual dispersion value of some route, then the processing advances to step S206.

For example, the accumulated dispersion value at ch1 of the route A=1.6×(1+2)+(−40×2−20×2)+(−15×2)+50×85/89=−57.4 [ps/nm], and this satisfies the lower limit of the dispersion tolerance.

Meanwhile, the accumulated dispersion value of the maximum dispersion route at ch40=3.8×(2+25+30)+(−40×2−20×2)+(−15×3)=51.6 [ps/nm], and this satisfies the dispersion tolerance. Consequently, all routes satisfy the dispersion tolerance, and therefore, the processing is ended.

Although the example described above relates to the Sub A flow, also the processing may possibly pass only the Sub B flow or both of the Sub A flow and the Sub B flow. Processing when the processing passes the Sub B flow is hereinafter described.

At step S206, it is decided whether or not the accumulated residual dispersion value of the route detected at step S204 fails to satisfy the lower limit of the dispersion tolerance. If the accumulated residual dispersion value of the route fails to satisfy the lower limit of the dispersion tolerance, then the processing returns to step S200, at which a minimum dispersion span is detected with the residual dispersion value of the span after the dispersion compensation set to an average dispersion value. If the accumulated residual dispersion value of the route does not fail to satisfy the lower limit of the dispersion tolerance at step S206, then the processing advances step S106. At steps S106, S108, S110 and S112, processes similar to those at steps S54, S56, S58 and S60 illustrated in FIG. 4 are executed, respectively. At step S114, it is decided whether or not the accumulated residual dispersion value of the route detected at step S112 fails to satisfy only the lower limit of the dispersion tolerance. If the accumulated residual dispersion value of the route fails to satisfy only the lower limit of the dispersion tolerance, then the processing advances to step S250 to execute the processing of the Sub B flow. If the accumulated residual dispersion value of the route fails to satisfy both of the upper and lower limits of the dispersion tolerance at sep S114, then the processing advances to step S116, at which a process similar to that at step S62 illustrated in FIG. 4 is executed.

At step S250, a minimum dispersion span #z is detected. This is intended to decrease the dispersion compensation amount of the minimum dispersion span so as to satisfy the lower limit of the dispersion tolerance. At step S252, the minimum dispersion span #z is decremented by −Δ (incremented by +Δ). At step S254, it is decided whether or not the accumulated residual dispersions of all of the routes satisfy the dispersion tolerance (dispersion tolerance decision 4). If the accumulated residual dispersions of all of the routes satisfy the dispersion tolerance, then the processing is ended. If the dispersion tolerance is not satisfied by the accumulated residual dispersion value of some route, then the processing advances to step S250, at which a minimum dispersion span is detected with the residual dispersion value of the span after the dispersion compensation set to an average dispersion value.

From the foregoing, in the ring network shown in FIG. 7, if dispersion compensation of incrementing the minimum dispersion span #2 by the dispersion compensation amount of +50 [ps/nm] is performed, then the dispersion tolerance is satisfied. Consequently, the present embodiment is ready also for a case wherein the lower limit of the dispersion tolerance is not satisfied.

Figure 9:
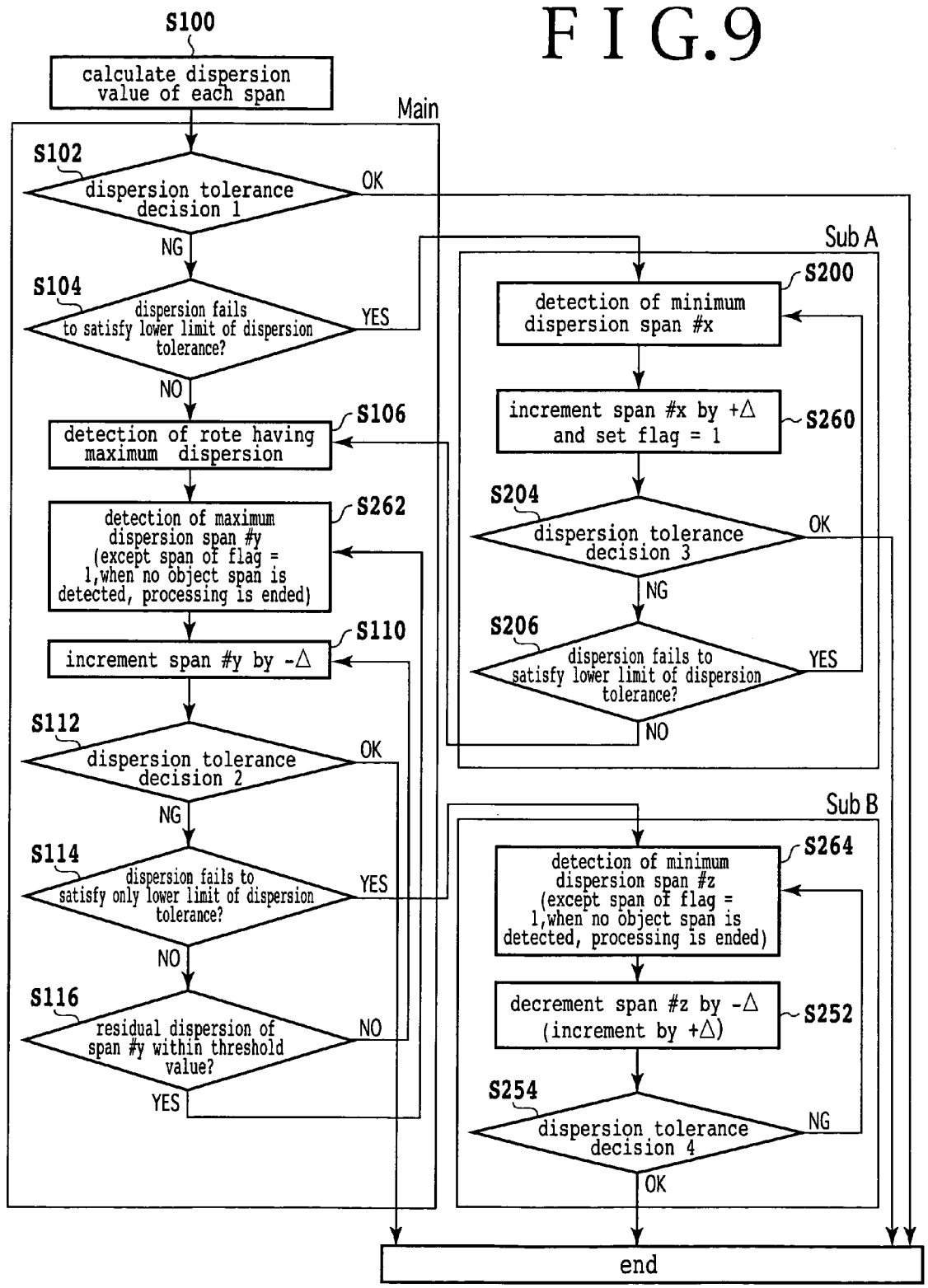
FIG. 9 is a flow chart of different dispersion compensator arrangement calculation by the third embodiment of the present invention.

FIG. 9 is a view showing another example of the dispersion compensator arrangement calculation flow chart. In FIG. 9, substantially like steps to those in FIG. 8 are denoted by like reference characters. In the Sub A flow, a step S260 is added in place of the step S202, and at step S260, the span #x is incremented by +Δ and a corresponding flag is set to 1. In the Main flow, a step S262 is added in place of the step S108. At step S262, a maximum dispersion span #y is detected and the processing is ended if a maximum dispersion span which makes an object span other than the span whose flag is 1 is not found. In the Sub B flow, a step S264 is added in place of the step S250. At step S264, a minimum dispersion span #z is detected and the processing is ended if a minimum dispersion span which makes an object span other than the span whose flag is 1 is not found. Owing to the steps mentioned, the lower limit of the dispersion tolerance is not satisfied again. Consequently, the span incremented by +Δ in the Sub A flow is prevented from being incremented by −Δ in the Main flow thereby to prevent the lower limit of the dispersion tolerance from being brought out of satisfaction again.

Fourth Embodiment

Figure 10A:
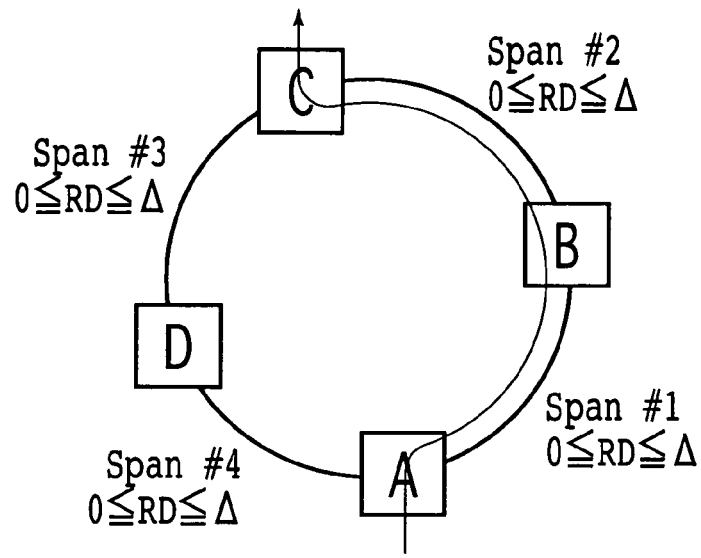
FIG. 10A is a view showing an optical transmission network according to a fourth embodiment of the present invention.
Figure 10B:
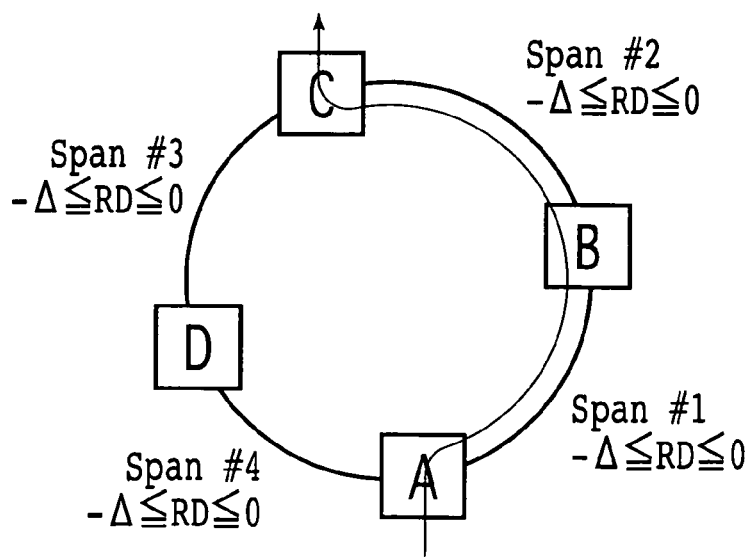
FIG. 10B is a view showing the optical transmission network according to the fourth embodiment of the present invention.
Figure 25:
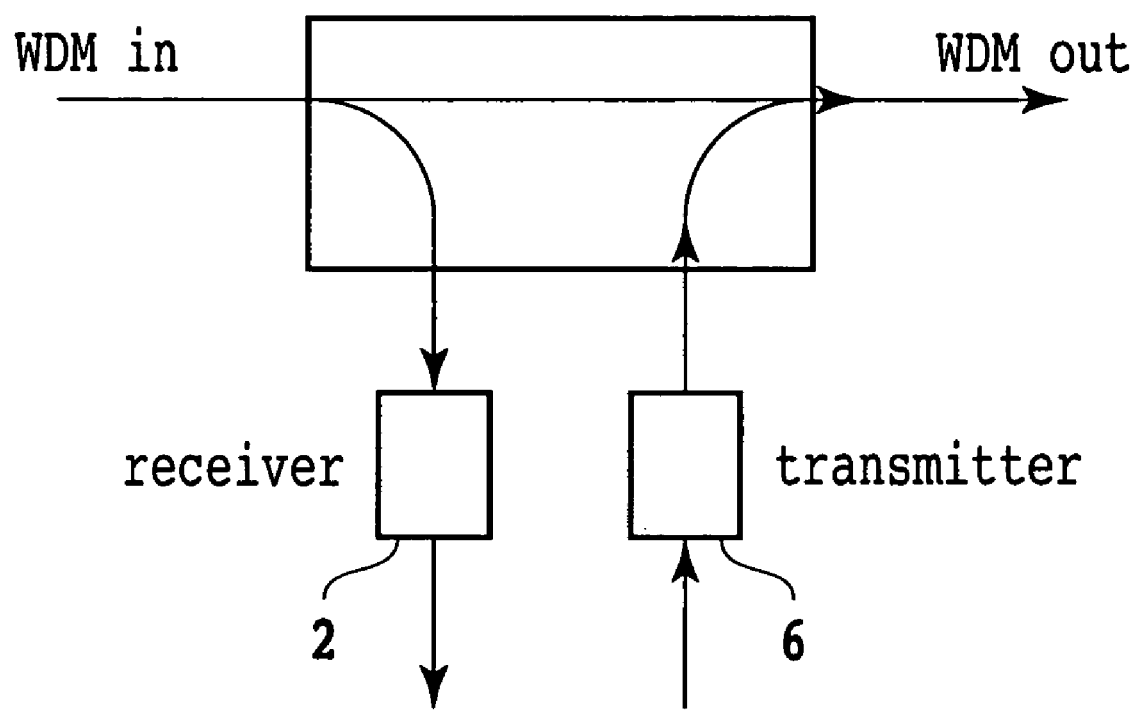
FIG. 25 is a view showing a configuration of a general optical ADM apparatus.
Figure 26:
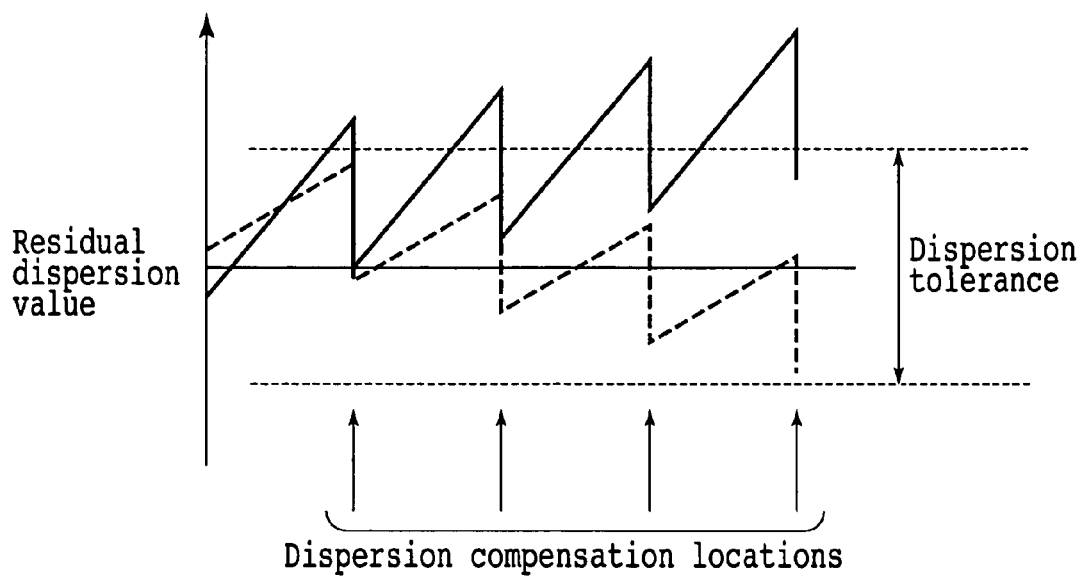
FIG. 26 is a view illustrating a dispersion tolerance and a residual dispersion.
Figure 27:
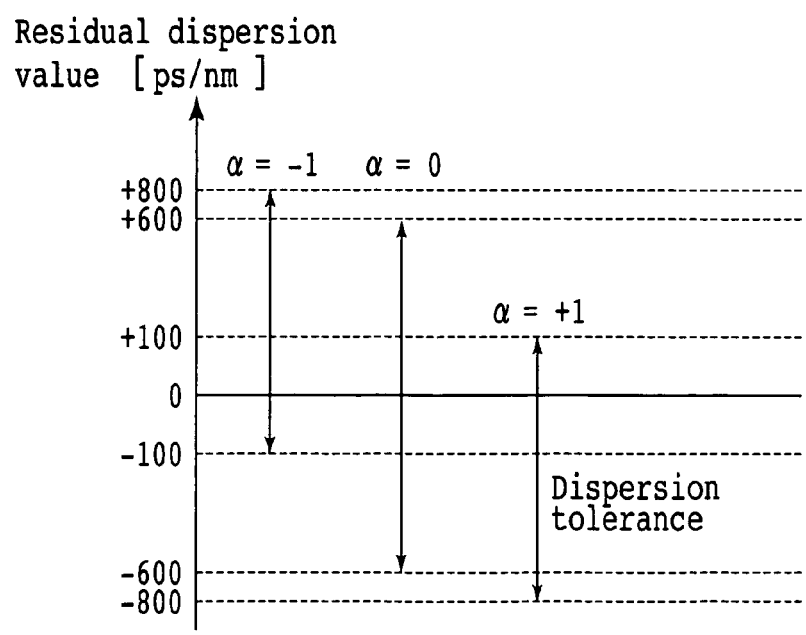
FIG. 27 is a view illustrating chirp and a dispersion tolerance.
Figure 28:
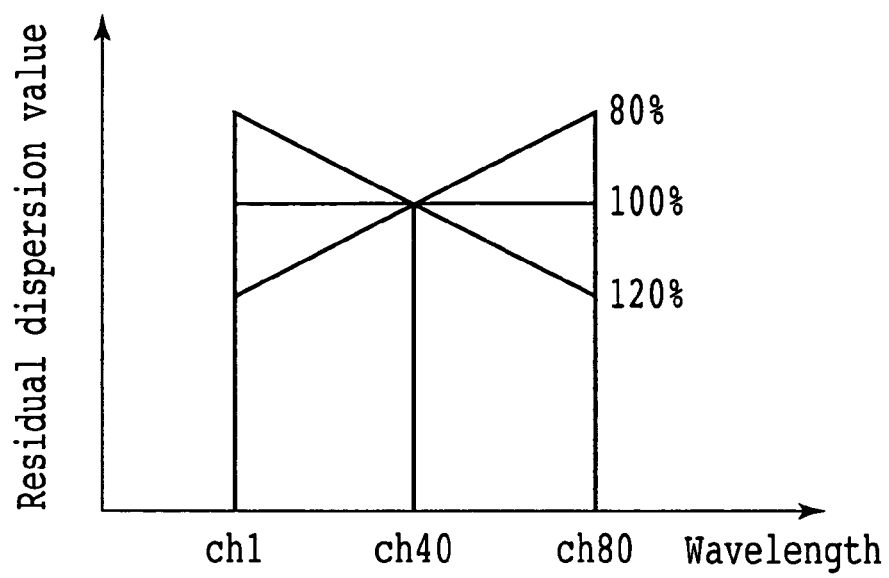
FIG. 28 is a view illustrating a slope compensation rate and a residual dispersion.
Figure 29:
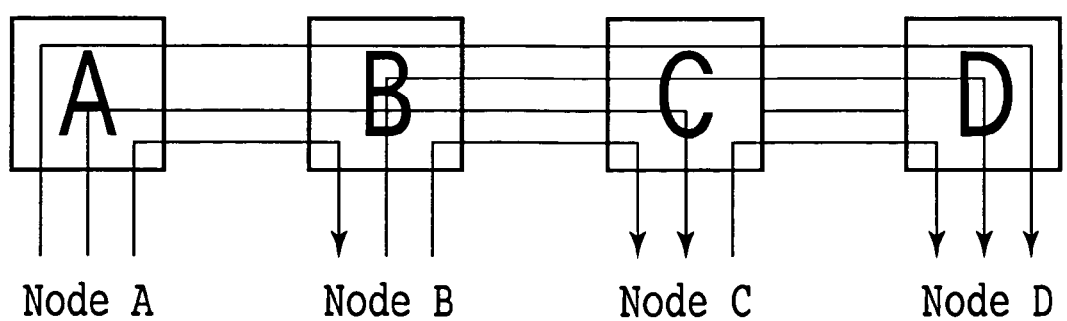
FIG. 29 is a view showing a linear network.
Figure 30:
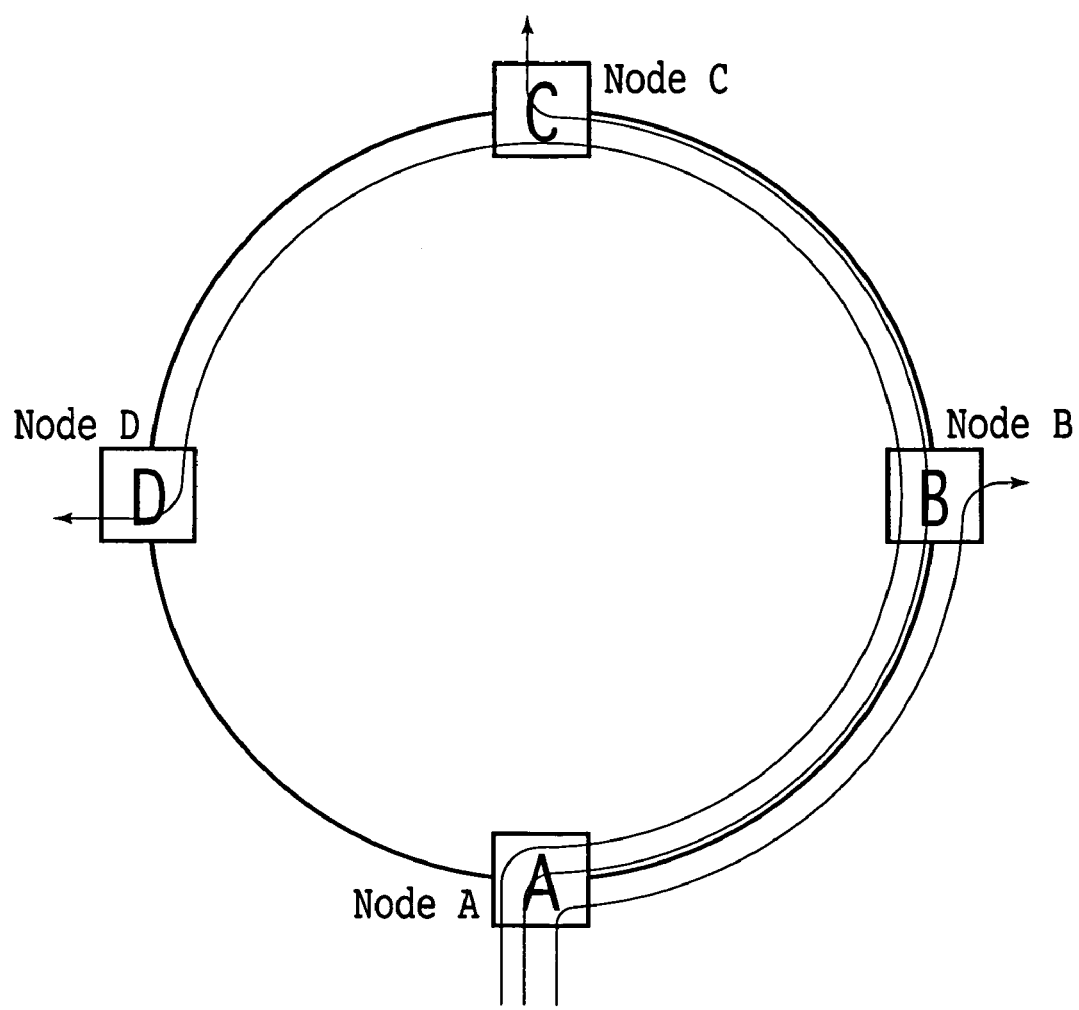
FIG. 30 is a view showing a ring network.
Figure 31:
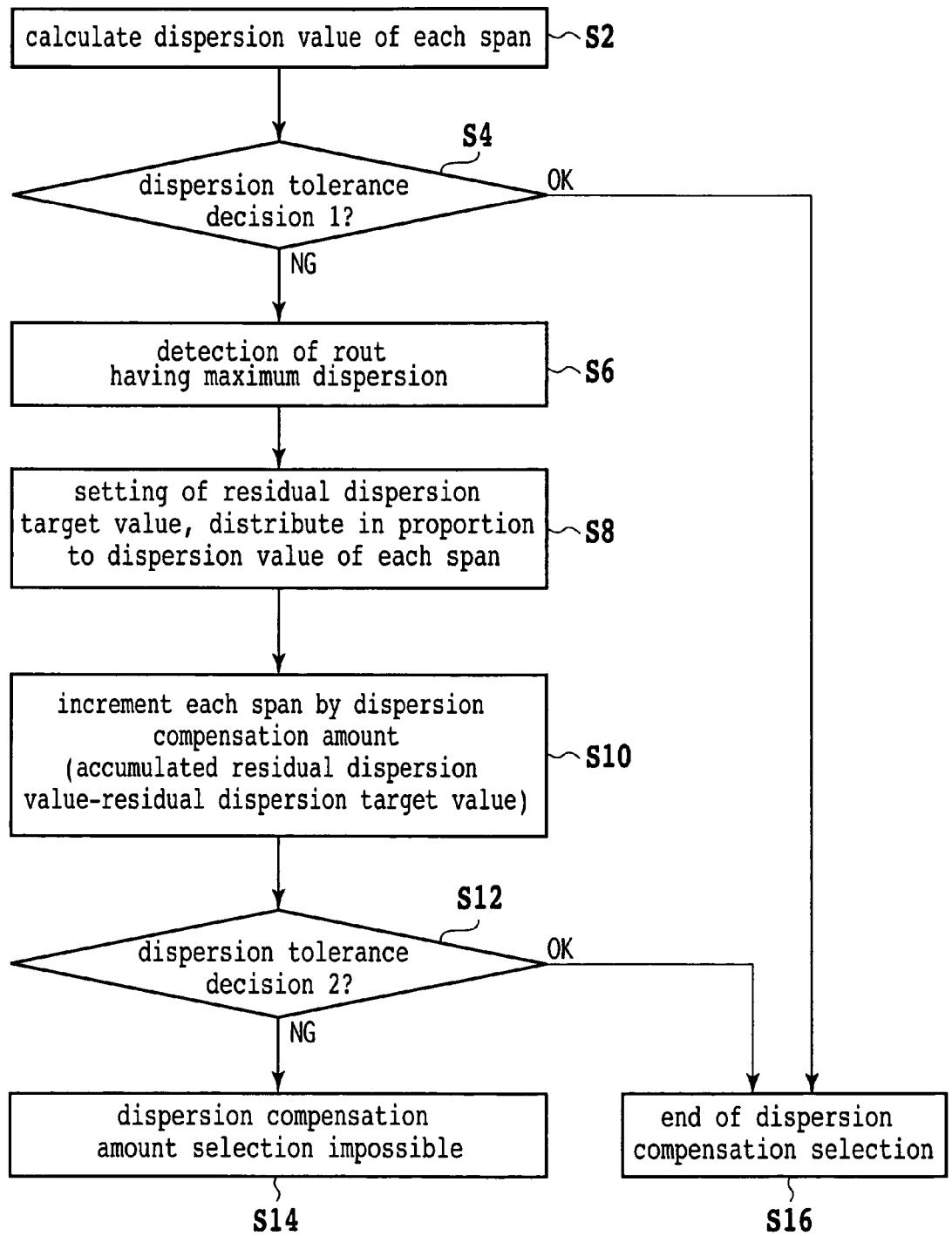
FIG. 31 is a flow chart of conventional dispersion compensator arrangement calculation.
Figure 32:
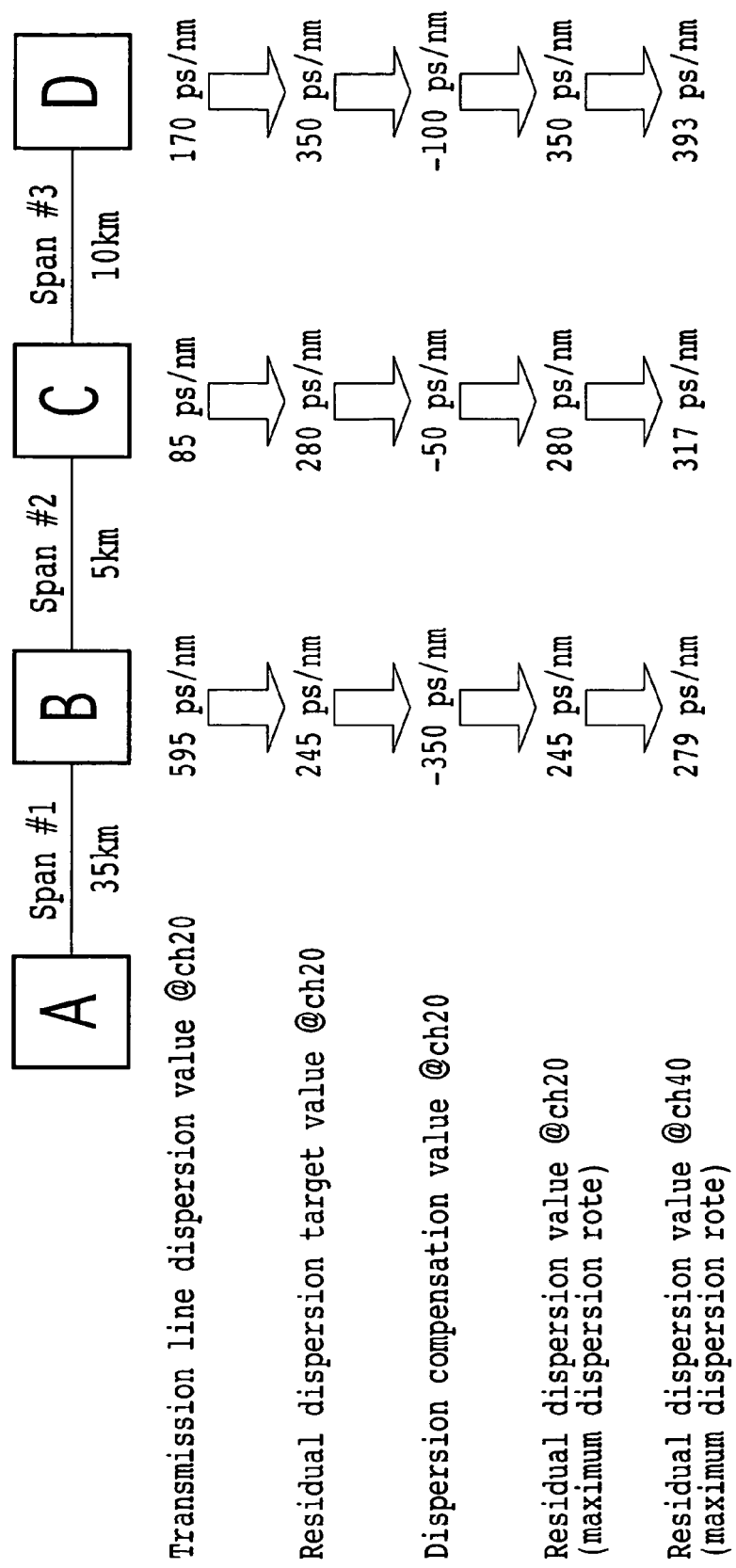
FIG. 32 is a view illustrating an example of dispersion compensator arrangement calculation for a conventional linear network.

FIGS. 10A and 10B are views showing optical transmission networks according to a fourth embodiment of the present invention. As described hereinabove with reference to FIG. 25, the dispersion tolerance varies in response to chirp. In particular, when the chirp is in the negative, the dispersion tolerance shifts to the positive side, but when the chirp is in the positive, the dispersion tolerance shifts to the negative side. Thus, since the transmission line dispersion coefficient is in the positive, when the chirp is in the negative, the positive dispersion tolerance increases, and consequently, the dispersion compensation amount can be reduced. On the other hand, when the chirp is in the positive, since it acts in a direction to cancel the non-linear effect, the dispersion tolerance equivalently becomes wider. Accordingly, it is effective to use the chirp depending upon the network.

For example, where the fiber light input is low and the non-linear effect is not very strong because the distance is comparatively short, it is effective to use negative chirp but where the fiber light input is high and the non-linear effect is strong because the distance is comparatively long, it is effective to use positive chirp.

When the chirp is in the negative, since the dispersion tolerance on the negative side is narrow, it is effective to perform dispersion compensation so that the residual dispersion may be in the positive. Similarly, when the chirp is in the positive, since the dispersion tolerance on the positive side is narrow, it is effective to perform dispersion compensation so that the residual dispersion may be in the negative.

FIG. 10A shows a ring network as an example of a comparatively short-distance optical transmission network. Since the chirp in a comparatively short-distance network is in the negative, if the residual dispersions of the spans #1, #2, #3 and #4 are set so as to satisfy $0 \leq$ (residual dispersions of the spans #1, #2, #3 and #4 )$\leq \Delta$ and the flow chart shown in FIG. 4 is applied to perform dispersion compensation, then the residual dispersion of the route AC becomes $0 \leq$ residual dispersion and the possibility that the lower limit value of the dispersion tolerance may be exceeded is reduced. On the contrary, if dispersion compensation is performed so that the condition of $-\Delta \leq$ (residual dispersion) $\leq 0$ may be satisfied in all of the spans #1, #2, #3 and #4, then the dispersion compensation amount increases, which gives rise to the possibility that the lower limit value of the dispersion tolerance may be exceeded. It is to be noted, however, that the threshold value may not be the dispersion compensation pitch $\Delta$ but may be some other value. Thus, in a comparatively short-distance network, the chirp is set to the negative and dispersion compensation is performed so that the condition of $0 \leq$ (residual dispersions of the spans) $\leq \Delta$ may be satisfied. FIG. 10B shows a ring network as an example of a comparatively long-distance optical transmission network. Since the chirp in a comparatively long-distance network is set to the positive, if the residual dispersions of the spans #1, #2, #3 and #4 are set so as to satisfy $-\Delta \leq$ (residual dispersions of the spans #1, #2, #3 and #4 )$\leq 0$ and the flow chart shown in FIG. 4 is applied to perform dispersion compensation, then the residual dispersion of the route AC becomes residual dispersion $\leq 0$ and the possibility that the upper limit value of the dispersion tolerance may be exceeded is reduced. On the contrary, if dispersion compensation is performed so that the condition of $0 \leq$ (residual dispersion) $\leq \Delta$ may be satisfied in all of the spans #1, #2, #3 and #4, then the dispersion compensation amount increases, which gives rise to the possibility that the upper limit value of the dispersion tolerance may be exceeded. It is to be noted, however, that the threshold value may not be the dispersion compensation pitch $\Delta$ but may be some other value.

Accordingly, if dispersion compensation is performed such that, when the chirp of the optical transmission network is in the negative, the condition of $0 \leq$ (residual dispersions of the spans) $\leq \Delta$ is satisfied, but when the chirp of the optical transmission network is in the positive, the condition of $-\Delta \leq$ (residual dispersions of the spans) $\leq 0$ is satisfied, then the totaling dispersion compensation amount can be suppressed small and also the number of dispersion compensators can be reduced.

Figure 11:
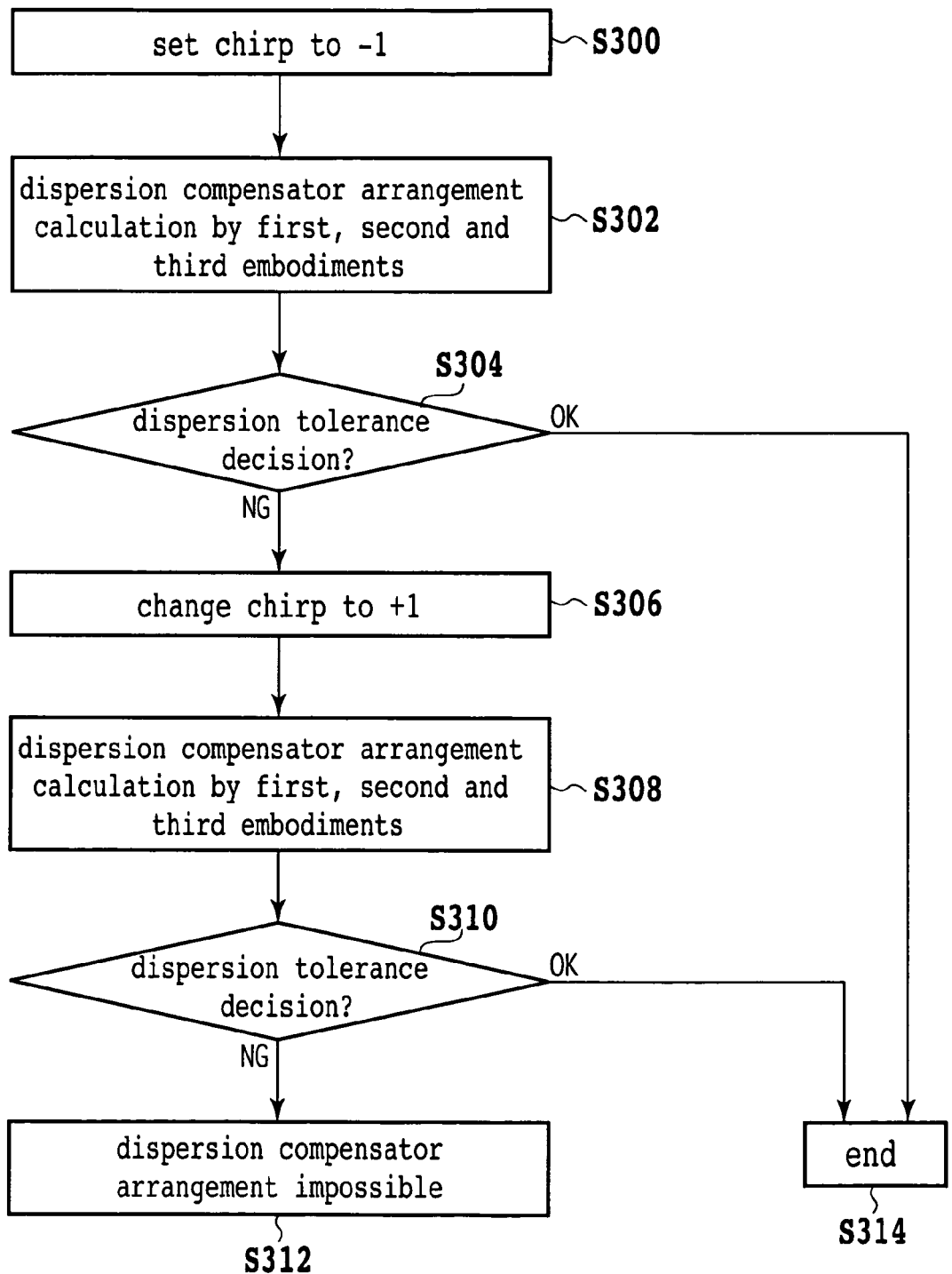
FIG. 11 is a flow chart of dispersion compensator arrangement calculation by the fourth embodiment of the present invention.

FIG. 11 is a flow chart of dispersion compensator arrangement calculation according to the fourth embodiment.

(1) As described hereinabove, when the chirp is in the negative, the dispersion compensation amount can be reduced. Therefore, first at step S300, the chirp is set to a negative value, for example, to −1.

(2) At step S302, dispersion compensator arrangement calculation is performed similarly as in the first, second and third embodiments.

(3) At step S304, it is decided whether or not the dispersion tolerance is satisfied. If the dispersion tolerance is satisfied, then the processing advances to step S314, at which the dispersion compensator arrangement calculation is ended. If the dispersion tolerance is not satisfied, then the processing advances to step S306.

(4) At step S306, the chirp is changed to a positive value, for example, to +1.

(5) At step S308, dispersion compensator arrangement calculation is performed similarly as in the first, second and third embodiments.

(6) At step S310, it is decided whether or not the dispersion tolerance is satisfied. If the dispersion tolerance is satisfied, then the dispersion compensator arrangement calculation is ended. If the dispersion tolerance is not satisfied, then the processing advances to step S312.

(7) At step S312, it is determined that the dispersion compensator arrangement is impossible.

While it is assumed here that the chirp is in the negative (−1) and in the positive (+1) as an example, it may have some other value, or it is otherwise possible to change the chirp consecutively like, for example, . . . , −1, −0.9, −0.8, . . . , −0.1, 0, +0.1, . . . , +0.9, +1.0, . . . .

Fifth Embodiment

Figure 12A:
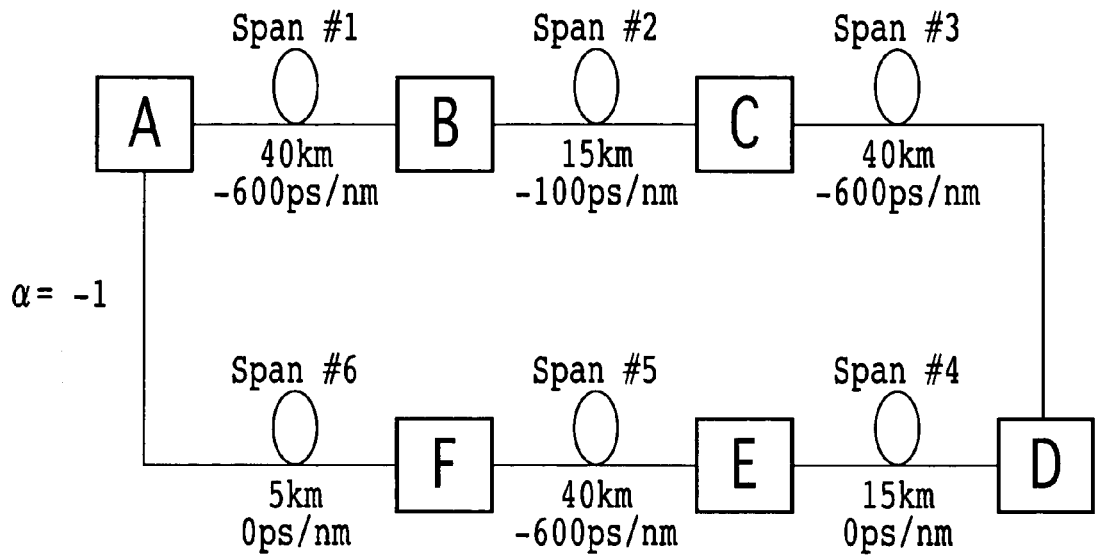
FIG. 12A is a view showing an optical transmission network according to a fifth embodiment of the present invention.
Figure 12B:
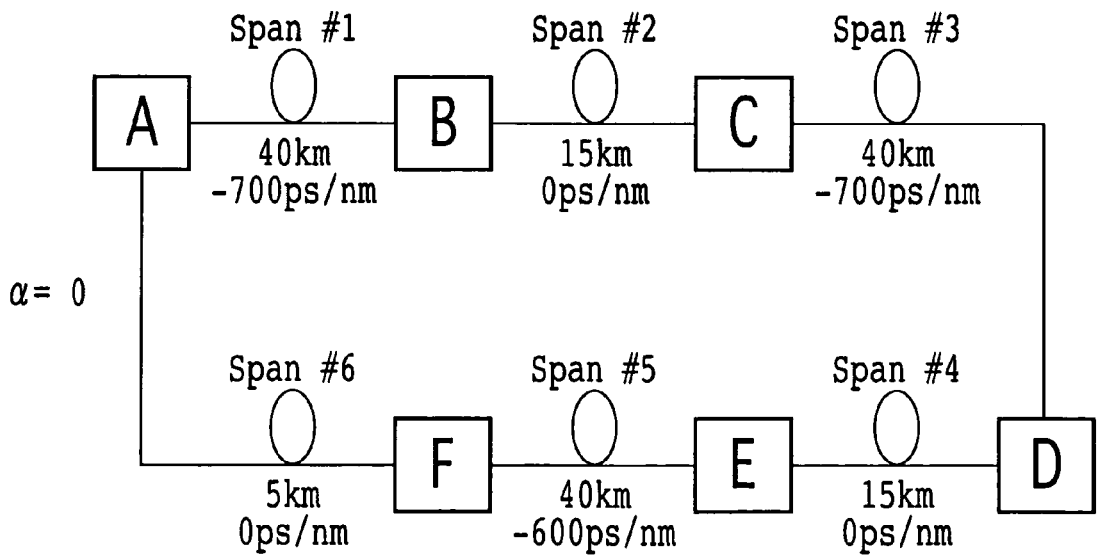
FIG. 12B is a view showing the optical transmission network according to the fifth embodiment of the present invention.

FIGS. 12A and 12B are views showing optical transmission networks according to a fifth embodiment of the present invention. Although dispersion compensation where the chirp is in the negative/positive is described above, where the chirp is 0, the total number of dispersion compensators in an overall network can sometimes be reduced when compared with those where the chirp is in the negative/positive. Therefore, in the present embodiment, after the flow chart shown in FIG. 4 is applied to perform the dispersion compensator arrangement calculation in a case wherein the chirp is in the negative/positive, if the number of dispersion compensators can be reduced by performing dispersion compensator arrangement calculation with the chirp set to 0, then a result of the dispersion compensator arrangement calculation where the chirp is 0 is adopted. For example, the chirp is set to zero, and the dispersion compensation amount of a span whose dispersion compensation amount is in the minimum but other than 0 in a result of dispersion compensator arrangement calculation obtained with the chirp set to −1 is distributed to adjacent spans to reduce the dispersion compensation amount of the span of the minimum dispersion compensation amount to 0 thereby to eliminate a dispersion compensator to decrease the number of dispersion compensators.

In the following, dispersion compensation in the case of ring networks which include nodes A, B, C, D, E and F as seen in FIGS. 12A and 12B is described. The following prerequisites are used.

SMF (single mode fiber);
maximum wavelength number: 40 waves;
transmission line dispersion coefficient of ch1: 16 ps/nm/km, dispersion compensating fiber dispersion coefficient: −77 ps/nm/km
transmission line dispersion coefficient of ch20: 17 ps/nm/km, dispersion compensating fiber dispersion coefficient: −80 ps/nm/km;
transmission line dispersion coefficient of ch40: 18 ps/nm/km, dispersion compensating fiber dispersion coefficient: −83 ps/nm/km;
dispersion compensation pitch: $\Delta$=100 ps/nm
span #1 of the route of the nodes A, B: 40 km
span #2 of the route of the nodes B, C: 15 km
span #3 of the route of the nodes C, D: 40 km
span #4 of the route of the nodes D, E: 15 km
span #5 of the route of the nodes E, F: 40 km
span #6 of the route of the nodes F, A: 5 km Here, a dispersion of any other than the transmission line is ignored.

(a) Where the chirp is −1

FIG. 12A is a view illustrating a result of dispersion compensator arrangement calculation where the chirp is −1.

Where the chirp is −1, the dispersion tolerance at each node: −100 to +800 ps/nm.

(1) The dispersion compensation pitch $\Delta$ is set to $\Delta$= 100 [ps/nm].

(2) The accumulated dispersion value of the maximum dispersion route at ch40=18×(40+15+40+15+40)= 2,700 [ps/nm] and does not satisfy the dispersion tolerance.

(3) The maximum dispersion spans #1, #3 and #5 in the maximum dispersion route are each incremented by −600 [ps/nm].

The accumulated dispersion value of the maximum dispersion route at ch40=18×(40+15+40+15+40)−600×3×83/80=832 [ps/nm], and this does not satisfy the dispersion tolerance.

At this time, since the residual dispersions at ch40 of the spans #1, #3 and #5=18×40−600×83/80= 98 ps/nm, the residual dispersions satisfy the condition that they are within the threshold value.

(4) A maximum dispersion route is re-searched. The maximum dispersion route is the route which passes the spans #1, #2, #3, #4 and #5.

Since the accumulated dispersion value of the maximum dispersion route at ch40=18×(40+15+40+15+40) −600×3×83/80=833 [ps/nm], if the maximum dispersion span #2 is incremented by −100 ps/nm, then the accumulated dispersion value of the maximum dispersion route at ch40=18×(40+15+40+15+40)−(600×3+100)×83/80=729 [ps/nm]. Thus, all of the routes satisfy the dispersion tolerance.

(5) In short, where the chirp is −1, a dispersion compensator of −600 [ps/nm] is required for the span #1; a dispersion compensator of −100 [ps/nm] is required for the span #2; a dispersion compensator of −600 [ps/nm] is required for the span #3; and a dispersion compensator of −600 [ps/nm] is required for the span #5.

(b) Where the chirp is 0

FIG. 12B is a view illustrating a result of dispersion compensator arrangement calculation where the chirp is 0.

Where the chirp is 0, the dispersion tolerance at each node: −600 to +600 ps/nm. The condition in this instance is that all routes satisfy the dispersion tolerance.

(1) The span #2 which has a dispersion compensation amount whose absolute value is lowest is selected in the result of selection of dispersion compensators where the chirp is −1, and the dispersion compensation amount of the span #2 is reduced to 0.

(2) Although it is necessary for the residual dispersion to satisfy the dispersion tolerance in the route only of the span #2 whose the number of dispersion compensator is reduced, the residual dispersion at ch40 of the span #2=18×15=270 [ps/nm] and satisfies the dispersion tolerance.

(3) The dispersion compensation amounts of the spans #1 and #3 preceding to and following the span #2 are increased so that all routes which pass the span #2 may satisfy the dispersion tolerance.

For example, if the dispersion compensation amount of the span #1 is set to −700 [ps/nm] and the dispersion compensation amount of the span #3 is set to −700 [ps/nm], then all of the routes which pass the span #2 satisfy the dispersion tolerance.

(4) In short, where the chirp is 0, a dispersion compensator of −700 [ps/nm] is required for the span #1; a dispersion compensator of −700 [ps/nm] is required for the span #3; and a dispersion compensator of −600 [ps/nm] is required for the span #5. Consequently, the number of dispersion compensators can be reduced from that where the chirp is −1, that is, from 4 to 3.

Figure 13:
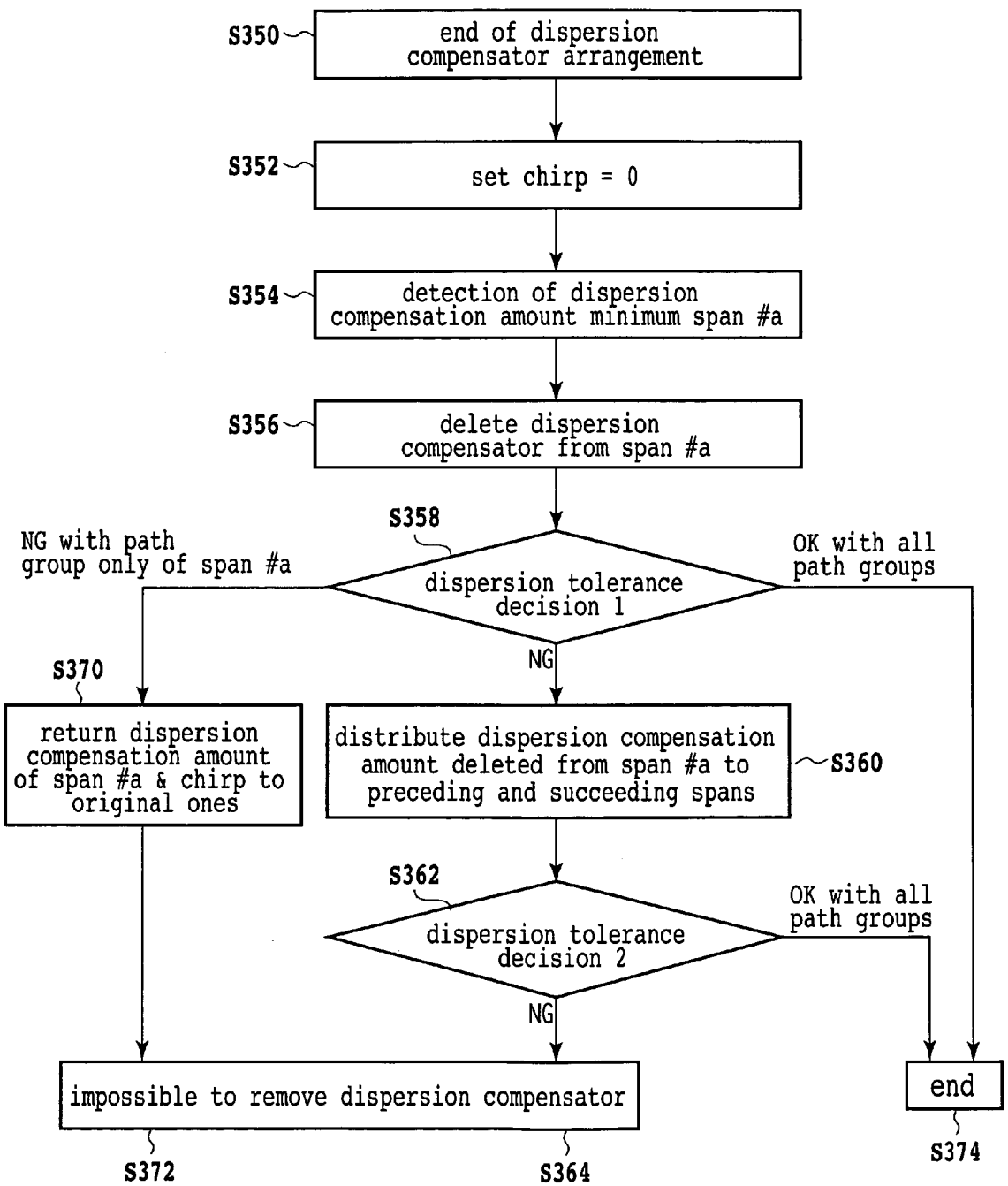
FIG. 13 is a flow chart of dispersion compensator arrangement calculation by the fifth embodiment of the present invention.

FIG. 13 is a dispersion compensator arrangement calculation flow chart according to the fifth embodiment of the present invention.

(1) At step S350, after dispersion compensator arrangement is completed with the chirp set to any other value than 0, for example, with the chirp set to −1 or +1, it is examined whether or not the number of dispersion compensators can be decreased. Where the absolute value of a dispersion compensation amount is low, it is worth while to examine whether or not the number of dispersion compensators can be decreased.

(2) At step S352, the chirp is set to 0 (need not exactly be set to 0. If the chirp is −1, then the dispersion tolerance is narrow on the negative side, and but if the chirp is +1, then the dispersion tolerance is narrow on the positive side, and therefore, in both cases, the number of dispersion compensators cannot be reduced readily).

(3) At step S354, a span #a whose dispersion compensation amount is minimum is detected.

(4) At step S356, a dispersion compensator is deleted from the span #a.

(5) At step S358, it is decided whether or not all path groups satisfy the dispersion tolerance, whether or not only the path group of the span #a satisfies the dispersion tolerance or whether or not some path group is present which does not satisfy the dispersion tolerance other than the path group which passes only the span #a. If all path groups satisfy the dispersion tolerance, then the processing advances to step S374, at which the dispersion compensator arrangement calculation result in which the dispersion compensator of the span #a is deleted from the dispersion compensator arrangement calculation result at step S350 is adopted and then the processing is ended. If the path group of the span #a does not satisfy the dispersion tolerance, then the processing advances to step S370. However, if some path group is present which does not satisfy the dispersion tolerance other than the path group which passes only the span #a, the processing advances to step S360.

(6) At step S360, the dispersion compensation amount deleted from the span #a is distributed to one of the preceding and succeeding spans to the span #a. For example, the dispersion compensation amount is distributed as uniformly as possible. Further, the dispersion compensation amount to be distributed to the preceding or succeeding span may not be equal to the deleted dispersion compensation amount.

(7) At step S362, it is decided whether or not all of the path groups satisfy the dispersion tolerance. If all of the path groups satisfy the dispersion tolerance, then the processing advances to step S374, at which the dispersion compensator arrangement calculation result in which the dispersion compensator is deleted from the span #a from the dispersion compensator arrangement calculation result at step S350 and is added to the preceding or succeeding span to the span #a is adopted and then the processing is ended. If the dispersion tolerance is not satisfied, then it is decided at step S372 that it is impossible to remove a dispersion compensator, and the dispersion compensator arrangement calculation result at step S350 is adopted.

(8) At step S370, the dispersion compensation amount and the chirp of the span #a are returned to the original ones, and it is decided that it is impossible to remove a dispersion compensator.

Sixth Embodiment

FIGS. 14A and 14B are views showing an optical transmission network according to a sixth embodiment of the present invention. In an optical transmission network system, a maximum gain of the system is sometimes determined from restriction in capacity of an amplifier or some other reason. Accordingly, it becomes a condition in design of an optical transmission network that the total loss of a transmission line and dispersion compensators does not exceed the maximum gain. In other words, it is necessary in design to suppress the sum of the transmission line loss of the spans and the loss of the dispersion compensators to the maximum gain or less. Therefore, in the present embodiment, where a maximum gain is determined, dispersion compensator arrangement calculation which can extend the transmission distance is performed.

FIG. 14A is a view illustrating a selection result of dispersion compensators according to the following parameters where the chirp is −1:

SMF (single mode fiber);
maximum wavelength number: 40 waves;
transmission line dispersion coefficient of ch1: 16 ps/nm/km, dispersion compensating fiber dispersion coefficient: −77 ps/nm/km
transmission line dispersion coefficient of ch20: 17 ps/nm/km, dispersion compensating fiber dispersion coefficient: −80 ps/nm/km;
transmission line dispersion coefficient of ch40: 18 ps/nm/km, dispersion compensating fiber dispersion coefficient: −83 ps/nm/km;
dispersion tolerance at each node: −100 to +800;
maximum gain of the system: 12.5 dB
dispersion compensation pitch: Δ=50 ps/nm
span #1 of the route of the nodes A, B: 5 km
span #2 of the route of the nodes B, C: 30 km
span #3 of the route of the nodes C, D: 10 km
Where the chirp is −1, a dispersion compensator of −400 [ps/nm] is required for the span #2.

Here, if it is assumed that, in the span #2, the transmission line single mode fiber of the length of 30 km exhibits a loss of 7.5 dB while the dispersion compensator has a dispersion amount of −400 ps/nm and exhibits a loss of 5 dB, then even if it is tried to extend the transmission distance of the span #2, this is impossible because the total loss of the single mode fiber and the dispersion compensator is 12.5 dB. Further, since the spans #1 and #3 individually have a short transmission distance, there is no necessity to insert a dispersion compensator into them, and even if a dispersion compensator is inserted, since the absolute value of the lower limit of the dispersion tolerance is low, the insertion is not effective for extension of the transmission distance of the span #2. In this manner, where the chirp is −1, the transmission distance of the route BC cannot be elongated although it is desired to elongate the same.

On the other hand, if the chirp is set to 0, then it is possible to make the spans #1 and #3 having a short transmission distance overcompensating. The overcompensation is to make the residual dispersion amount of a span negative. For example, where the chirp is 0, the dispersion tolerance is approximately −600 to +600 ps/nm, and the absolute value of the lower limit is higher than that where the chirp is −1. In this instance, the dispersion compensation amount by the dispersion compensator in the span #2 is moved to the span #1 and the span #3 so that the routes AB, BC, CD, AC and BD may individually satisfy the dispersion tolerance. Since this decreases the loss of the dispersion compensator of the span #2, the transmission line of the span #2 can be extended. For example, if the dispersion compensation amount is moved by −200 [ps/nm] to each of the spans #1 and #3 as seen in FIG. 14B, then residual dispersion at ch40 of the route AB= 18×5−200×83/80=−118 [ps/nm]

residual dispersion at ch1 of the route AB= 16×5− 200×77/80=−113 [ps/nm]

residual dispersion at ch40 of the route BC= 18×33=594 [ps/nm]

residual dispersion at ch1 of the route BC=16×33= 528 [ps/nm]

residual dispersion at ch40 of the route CD= 18×10−200×83/80=−28 [ps/nm]

residual dispersion at ch1 of the route CD= 16×10−200×77/80=−33 [ps/nm]

residual dispersion at ch40 of the route AC= 18×(5+33)−200×83/80=477 [ps/nm]

residual dispersion at ch1 of the route Ac= 16×(5+33)−200×77/80=416 [ps/nm]

residual dispersion at ch40 of the route BD= 18×(33+10)−200×83/80=567 [ps/nm]

residual dispersion at ch1 of the route BD= 16×(33+10)−200×77/80=496 [ps/nm]

Since all of the residual dispersions satisfy the dispersion tolerance, the transmission distance of the span #2 can be extended to 33 km as seen in FIG. 14B. Although a single mode fiber and a dispersion compensator are disposed in order in FIGS. 14A and 14B, the order of them may be reversed. Since the loss of a dispersion compensator relies upon the dispersion compensation amount (the loss increases as the dispersion compensation amount increases), even if the dispersion compensator of the span #2 cannot be eliminated, the transmission distance can be extended by decreasing the dispersion compensation amount. The transmission distance of a span whose transmission distance is to be extended can be extended by setting the chirp to 0 and decreasing the dispersion compensation amount of a span whose transmission distance is to be extended while the decreased amount of the dispersion compensation amount is moved to another span in such a manner as described above.

Figure 15:
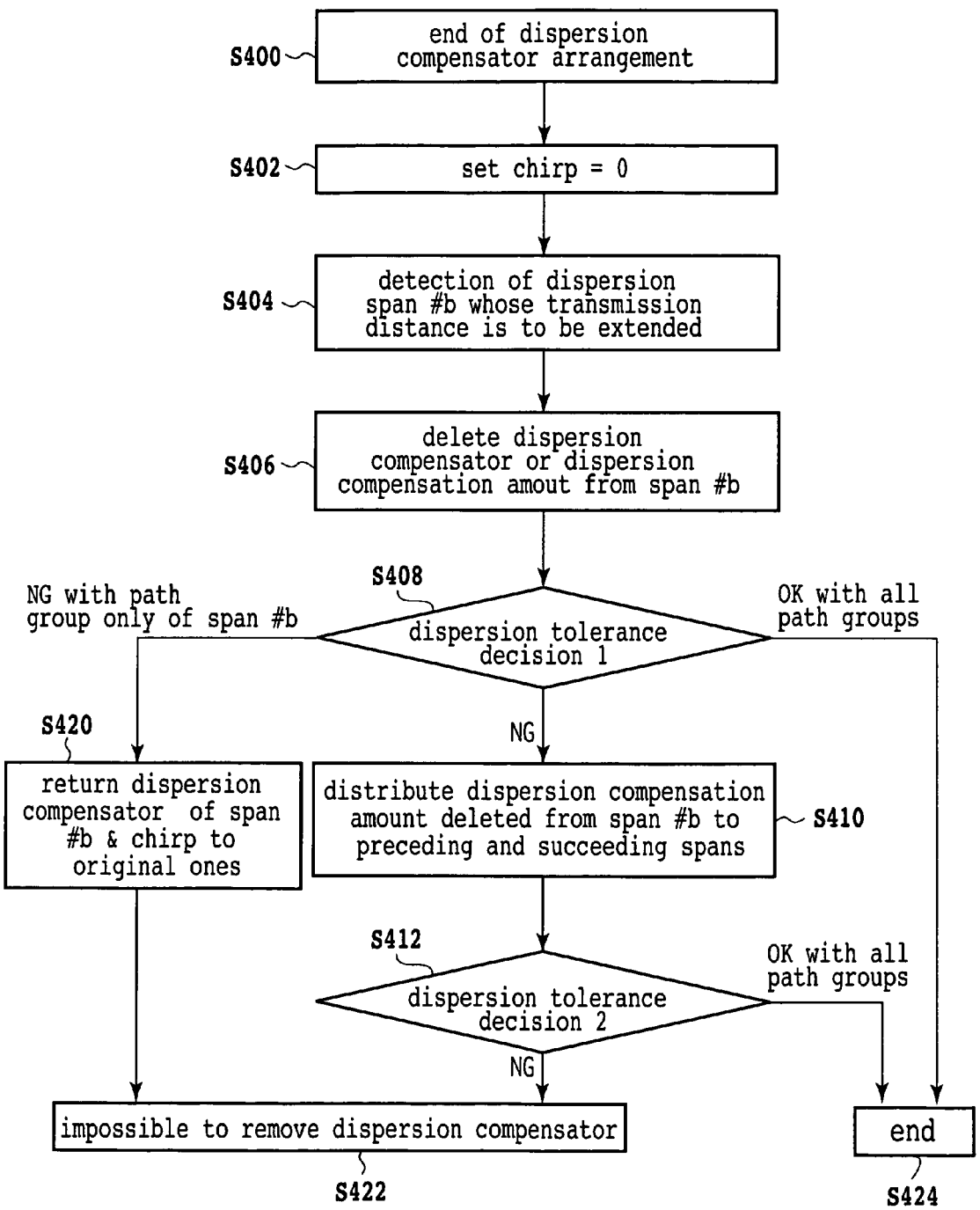
FIG. 15 is a flow chart of dispersion compensator arrangement calculation by the sixth embodiment of the present invention.

FIG. 15 is a flow chart of the dispersion compensator arrangement calculation according to the sixth embodiment of the present invention. The procedure of the dispersion compensator arrangement calculation flow chart of FIG. 15 is basically similar to that of the flow chart shown in FIG. 13. However, even if a dispersion compensator is not deleted, the loss of the dispersion compensator can be reduced by decreasing the dispersion compensation amount.

(1) At step S400, after dispersion compensator arrangement is completed with the chirp set to any other value than 0, for example, with the chirp set to −1 or +1, it is examined whether or not the transmission distance of a particular span can be extended.

(2) At step S402, the chirp is set to 0 (need not exactly be set to 0. If the chirp is −1, then the dispersion tolerance is narrow on the negative side, but if the chirp is +1, then the dispersion tolerance is narrow on the positive side, and therefore, in both cases, the number of dispersion compensators or the dispersion compensation amount cannot be reduced readily).

(3) At step S404, a span #b whose transmission distance is to be extended is detected.

(4) At step S406, a dispersion compensator or a dispersion compensation amount is deleted from the span #b. The dispersion compensation amount to be deleted depends upon the transmission distance to be extended, the losses of the dispersion compensator before and after the deletion and the loss factor of the transmission line. For example, if the transmission distance is to be extended by 5 km, then where the loss factor of the transmission line is 0.25 dB/km, the transmission line loss is 0.25×5=1.25 dB. The dispersion compensation amount to be deleted is determined from a relationship between the dispersion compensation amount and the loss.

(5) At step S408, it is decided whether or not all path groups satisfy the dispersion tolerance, whether or not only the path group of the span #b satisfies the dispersion tolerance or whether or not some path group is present which does not satisfy the dispersion tolerance other than the path group which passes only the span #b. If all path groups satisfy the dispersion tolerance, then the processing advances to step S424, at which the dispersion compensator of the span #b is deleted from the dispersion compensator arrangement calculation result and the dispersion compensator of the span #b is deleted from the dispersion compensator arrangement calculation result at step S400 to extend the transmission distance of the span #b so that all path groups may satisfy the dispersion tolerance and the system gain. If the path group of the span #b does not satisfy the dispersion tolerance, then the processing advances to step S420. However, if some path group is present which does not satisfy the dispersion tolerance other than the path group which passes only the span #b, then the processing advances to step S410.

(6) At step S410, the dispersion compensation amount deleted from the span #b is distributed to one of the preceding and succeeding spans to the span #b. For example, the dispersion compensation amount is distributed as uniformly as possible. Further, the dispersion compensation amount to be distributed to the preceding or succeeding span may not be equal to the deleted dispersion compensation amount.

(7) At step S412, it is decided whether or not all of the path groups satisfy the dispersion tolerance. If all of the path groups satisfy the dispersion tolerance, then the processing advances to step S424, at which the dispersion compensator of the span #b is deleted from the dispersion compensator arrangement calculation result at step S400 and is added to the preceding or succeeding span to the span #b to extend the transmission distance of the span #b so that all of the path groups may satisfy the dispersion tolerance and the system gain. If the dispersion tolerance is not satisfied, then it is decided at step S422 that it is impossible to remove a dispersion compensator to delete the dispersion compensation amount.

(8) At step S420, the dispersion compensation amount and the chirp of the span #b are returned to the original ones, and it is decided that it is impossible to remove a dispersion compensator and to delete the dispersion compensation amount.

Seventh Embodiment

Figure 16:
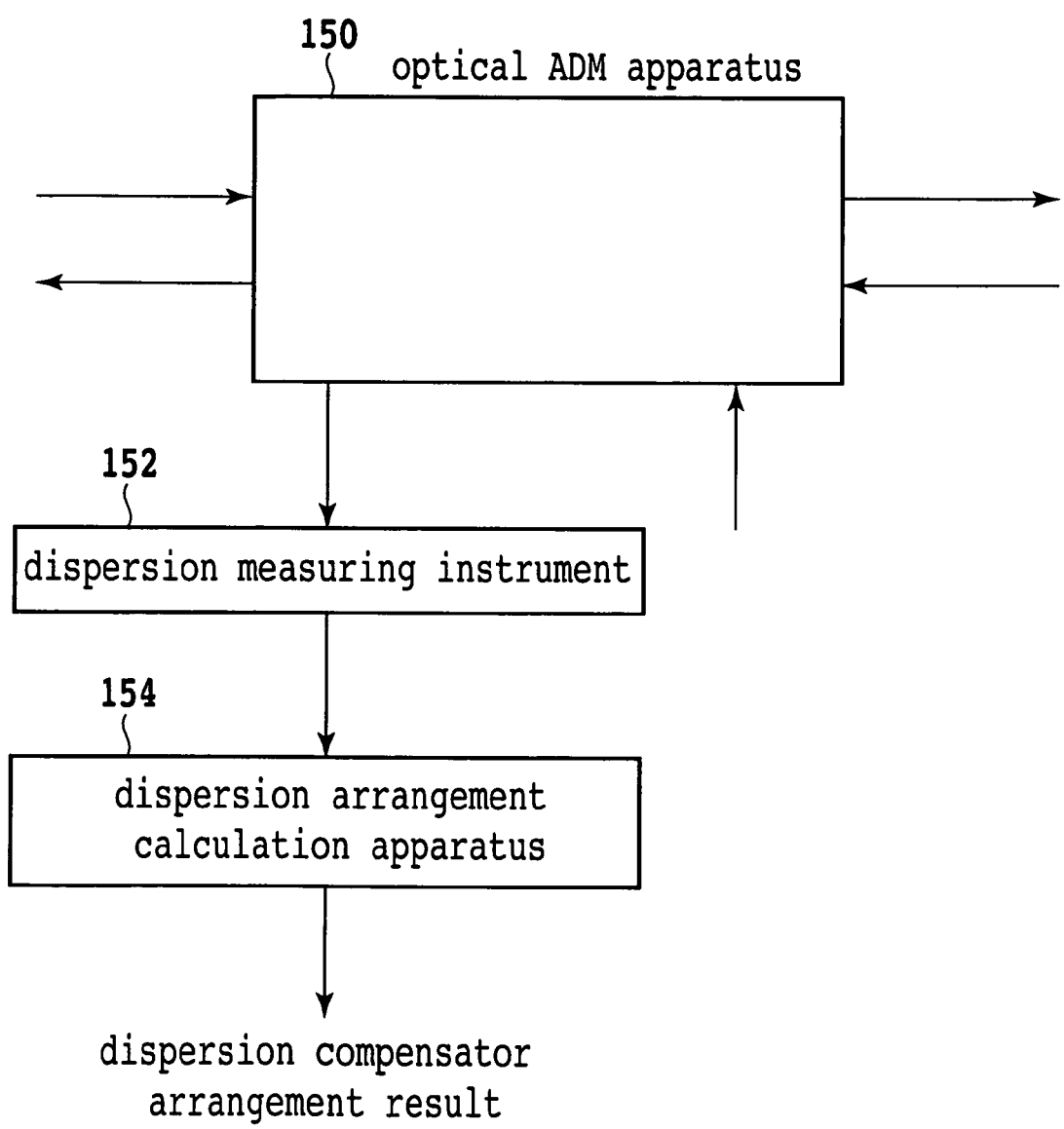
FIG. 16 is a view showing a dispersion compensator arrangement calculation apparatus according to a seventh embodiment of the present invention.

FIG. 16 is a view showing a configuration of a dispersion compensator arrangement calculation apparatus according to a seventh embodiment of the present invention. The dispersion compensator arrangement calculation apparatus is an apparatus which performs dispersion compensator arrangement calculation using a dispersion value measured by means of a dispersion measuring instrument 152 of an optical signal dropped by a receiver of an optical ADM apparatus 150 used as a node of an optical transmission network. The dispersion compensator arrangement calculation apparatus thus includes the dispersion measuring instrument 152 and a dispersion arrangement calculation apparatus 154. The dispersion measuring instrument 152 actually measures a dispersion [ps/nm] of an optical signal of each channel inputted to the optical ADM apparatus 150 which forms a node of the optical transmission network and outputs the measured dispersions to the dispersion arrangement calculation apparatus 154. For example, if the dispersion measuring instrument 152 is provided in the node D of FIG. 5, then the dispersion measuring instrument 152 can measure a dispersion value 1 of the route which passes the nodes A, B, C and D, another dispersion value 2 of the route which passes the nodes B, C and D, and a further dispersion value 3 of the route which passes the nodes C and D.

The dispersion arrangement calculation apparatus 154 is configured similarly as in FIG. 3. However, the dispersion arrangement calculation apparatus 154 does not calculate a dispersion value of a span from the transmission distance of the span and the transmission line dispersion coefficient as in the case of the span dispersion value calculation section 110 shown in FIG. 3, but calculates dispersion values of spans by calculation from the dispersion values of the spans measured by the dispersion measuring instrument 152. For example, the dispersion value of the span #1 is calculated from the dispersion values 1 and 2 and the dispersion value of the span #2 is calculated from the dispersion values 2 and 3 by calculation. The maximum dispersion route detection section 114 and so forth shown in FIG. 3 perform processing based on the measured dispersion values of the spans. Then, they output a result of the dispersion compensator arrangement calculation to a display apparatus. Consequently, the dispersion compensator arrangement calculation can be performed accurately in accordance with the measured dispersion values.

Eighth Embodiment

Figure 17:
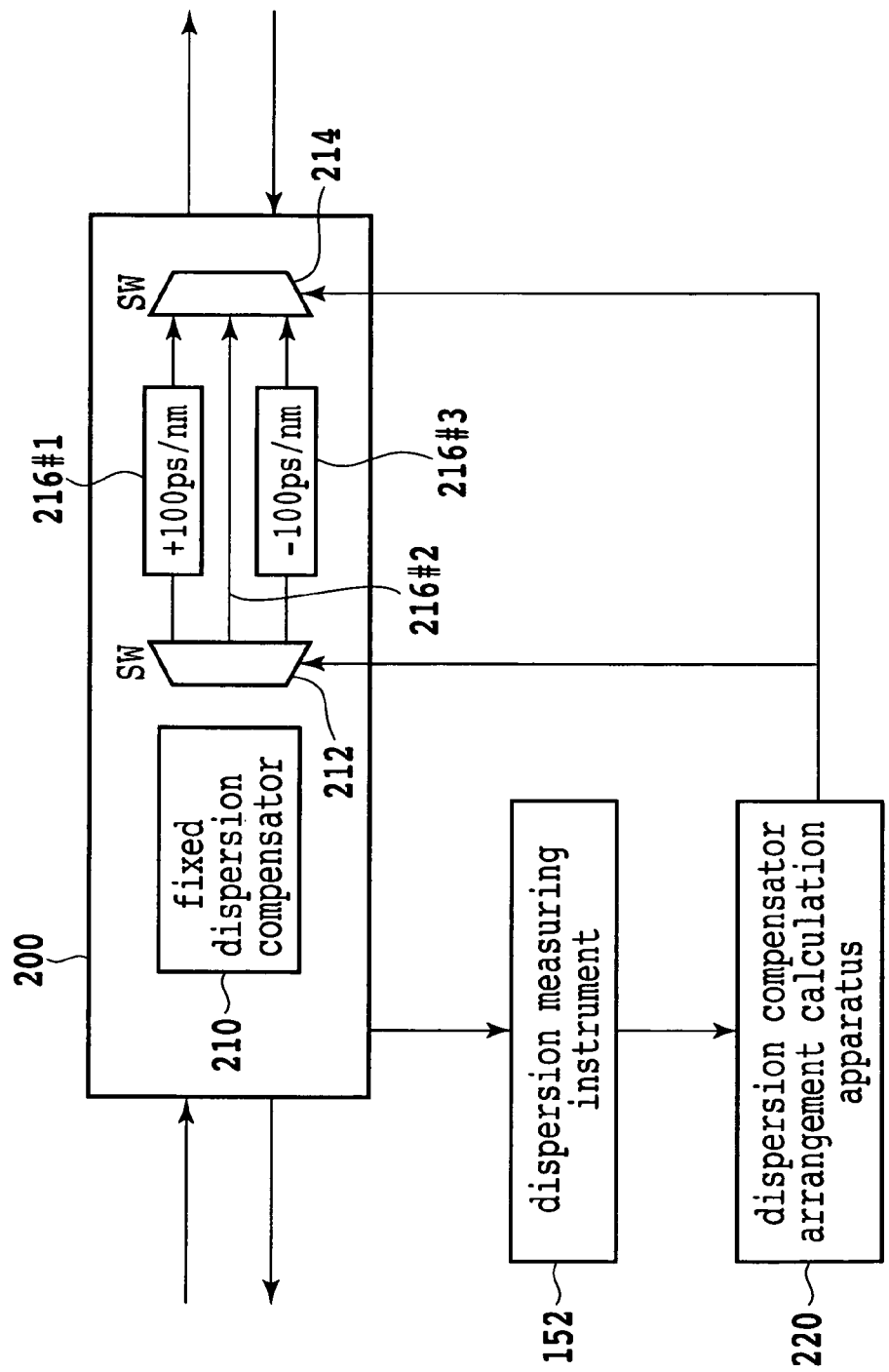
FIG. 17 is a view showing a dispersion compensator arrangement calculation apparatus according to an eighth embodiment of the present invention.

FIG. 17 is a view showing a configuration of a dispersion compensator arrangement calculation apparatus according to an eighth embodiment of the present invention. In FIG. 17, substantially like elements to those shown in FIG. 16 are denoted by like reference numerals. The dispersion compensator arrangement calculation apparatus 220 includes, in addition to the functional block group configured in a similar manner as in that of FIG. 3, a dispersion compensator selection section. The dispersion compensator selection section performs dispersion compensator arrangement calculation using dispersion values actually measured by the dispersion measuring instrument 152 and controls switches (SW) 212 and 214 in an optical ADM apparatus 200 formed as a node of an optical transmission network to select one of a plurality of dispersion compensators 216#1, 216#2 and 216#3 so that the dispersion compensation amount of the node obtained from the dispersion compensator arrangement calculation result may be adjusted. The dispersion compensation amounts of the dispersion compensators 216#1, 216#2 and 216#3 are, for example, +100, 0 and −100 [ps/nm], respectively.

A fixed dispersion compensator 210 performs, where rough dispersion values are known before actual dispersion value measurement, rough dispersion compensation in the node. Then, one of the dispersion compensators 216#1, 216#2 and 216#3 is selected based on the dispersion compensation amount of the optical ADM apparatus 200 calculated by the dispersion compensator arrangement calculation apparatus 220 to perform optimum dispersion compensation.

Ninth Embodiment

Figure 18:
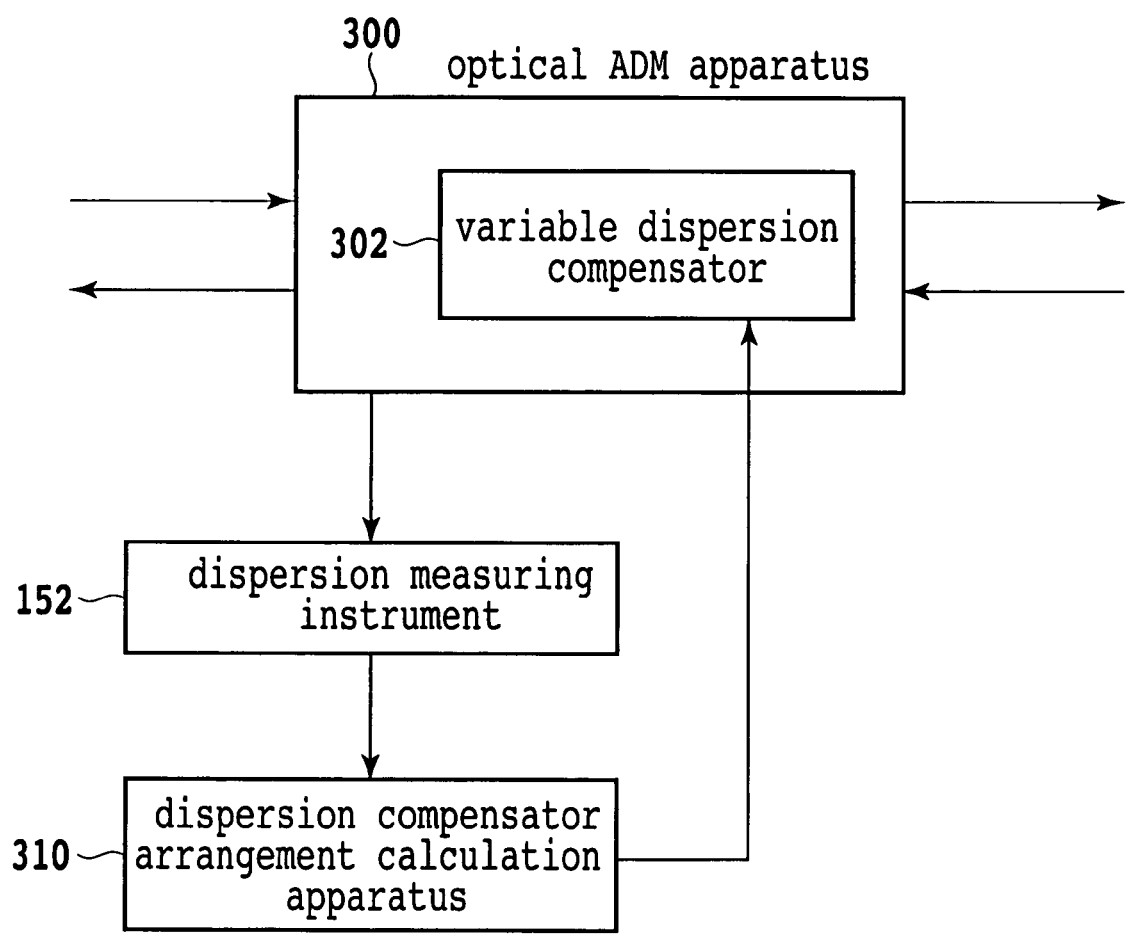
FIG. 18 is a view showing a dispersion compensator arrangement calculation apparatus according to a ninth embodiment of the present invention.

FIG. 18 is a view showing a configuration of a dispersion compensator arrangement calculation apparatus according to a ninth embodiment of the present invention, and in FIG. 18, substantially like elements to those shown in FIG. 16 are denoted by like reference numerals. The dispersion compensator arrangement calculation apparatus 310 includes, in addition to the functional block group configured in a similar manner as in that of FIG. 3, a variable dispersion compensator control section. The variable dispersion compensator control section performs dispersion compensator arrangement calculation using dispersion values actually measured by the dispersion measuring instrument 152 and controls a variable dispersion compensator 302 in an optical ADM apparatus 300 formed as a node of an optical transmission network so that the dispersion compensation amount of the variable dispersion compensator 302 may be used to adjust the dispersion compensation amount of the node obtained from a result of the dispersion compensator arrangement calculation. According to the present embodiment described, dispersion compensation of a span relating to a node can be performed accurately by means of the variable dispersion compensator.

Tenth Embodiment

Figure 19:
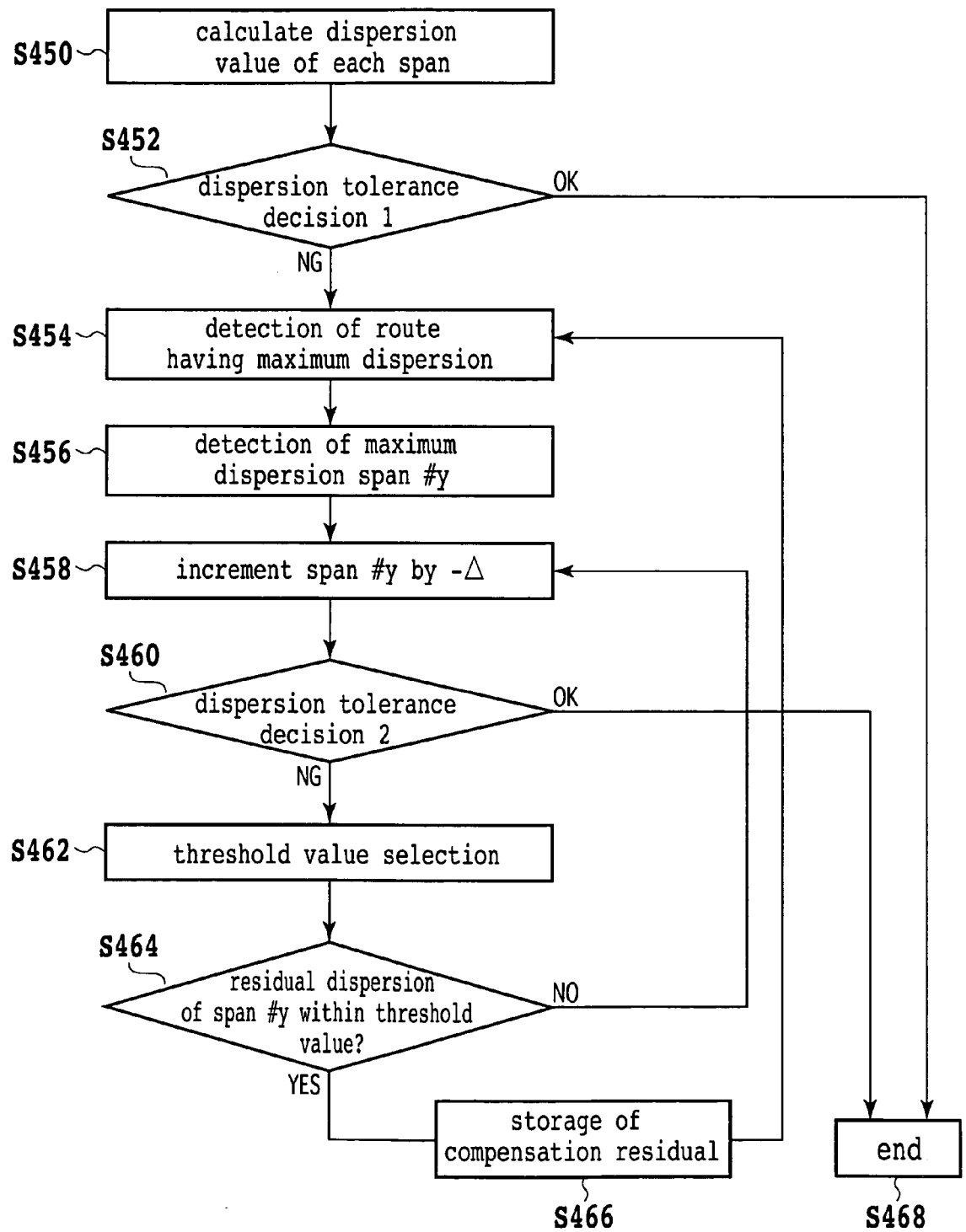
FIG. 19 is a flow chart of dispersion compensator arrangement calculation by a tenth embodiment of the present invention.

FIG. 19 is a flow chart of dispersion compensator arrangement calculation of an optical transmission network according to a tenth embodiment of the present invention. A dispersion compensator arrangement calculation apparatus similar to the apparatus shown in FIG. 2 can be configured if it includes a program based on the flow chart of FIG. 19. As described hereinabove with reference to FIG. 10A, where the chirp is in the negative, since the dispersion tolerance on the negative side is narrow, it is effective to successively compensate for the dispersion so that the residual dispersion may be in the positive. On the other hand, as described hereinabove with reference to FIG. 10B, where the chirp is in the positive, since the dispersion tolerance on the positive side is narrow, it is effective to successively compensate for the dispersion so that the residual dispersion may be in the negative. For example, where $\alpha = -1$, the menu pitch of the dispersion compensator is set to $\Delta = 100$ ps/nm, and the dispersion compensation is performed so that $0 \leq$ (residual dispersions) $\leq \Delta$ may be satisfied.

Figure 20:
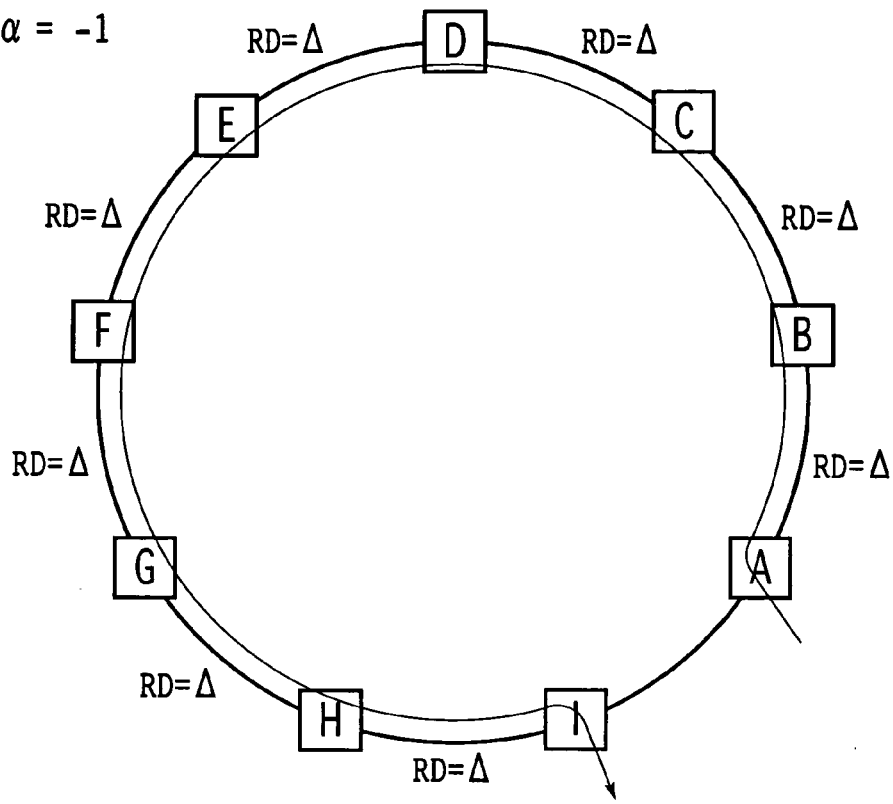
FIG. 20 is a view illustrating a problem.

FIG. 20 is a view illustrating a problem where the threshold value is fixed. An optical transmission network shown in FIG. 20 is a ring network formed from eight nodes, that is, nodes A to I. In this instance, if the residual dispersions of spans #1, #2, #3, #4, #5, #6, #7 and #8 of routes AB, BC, CD, DE, EF, FG, GH and HI b equal to $\Delta = 100$ ps/nm, then a dispersion compensation residual of up to totaling 800 ps/nm is accumulated. That is, in this embodiment, the dispersion tolerance can not be satisfied due to the residual. Although this is an extreme example, where a compensation residual is accumulated, the dispersion tolerance becomes narrow at least relatively. Therefore, in the present embodiment, a compensation residual of a span is stored, and a threshold value of a next span is selected based on the stored compensation residual. In the following, the dispersion compensator arrangement calculation of the present embodiment is described with reference to a flow chart of FIG. 19. The flow chart of FIG. 19 includes, in addition to steps similar to those of FIG. 4, compensation residual storage at step S466 and threshold value selection at step S462 based on the stored compensation residual.

(1) At steps S450 to S460, processes similar to those at steps S50 to S58 of FIG. 4 are executed, respectively.

(2) At step S462, threshold value selection is performed based on the stored compensation residual. For example, when the compensation residual stored with regard to a certain span is equal to the pitch $\Delta$, the threshold value for a next process is set to $-\Delta$.

In the optical transmission network shown in FIG. 20, if dispersion compensator arrangement calculation is preformed in order for the spans #1 and #2, then if the compensation residual of the span #1 is 100 ps/nm, then the compensation residual of the next span #2 is adjusted so as to satisfy $-50 \leq$ (residual dispersion) $\leq 0$ so that the compensation residual may not be accumulated as far as possible.

(3) At step S464, a process similar to that at step S62 of FIG. 4 is performed. Then at step S466, the compensation residual of the span is stored. Thereafter, the processing returns to step S454.

According to the present embodiment described above, since a compensation residual is stored and a threshold value for a next span is selected based on the stored compensation residual, accumulation of the compensation residual can be prevented, and relative narrowing of the dispersion tolerance arising from accumulation of the compensation residual can be prevented.

Eleventh Embodiment

Figure 21:
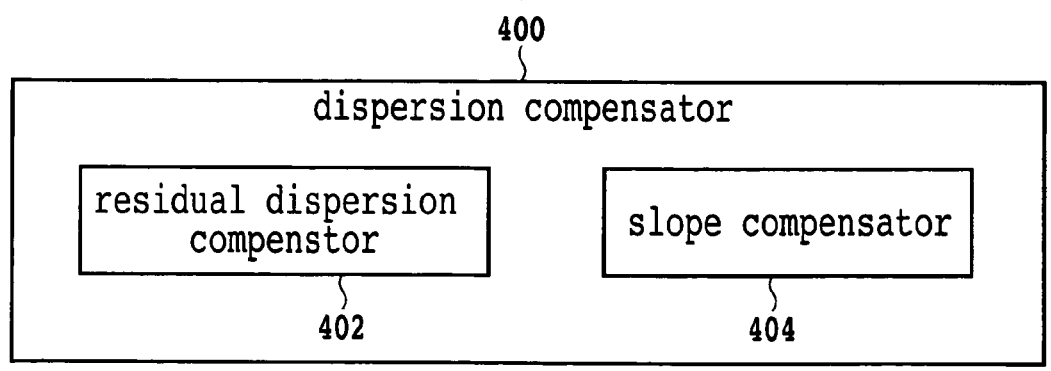
FIG. 21 is a view showing a dispersion compensator according to an eleventh embodiment of the present invention.

FIG. 21 is a view showing a configuration of a dispersion compensator 400 according to an eleventh embodiment of the present invention. When dispersion compensation by a dispersion compensator is successively performed, even if a residual dispersion value of a target is used as a target value, the dispersion slope has an influence to increase the residual dispersion value of a ch on the long wavelength side and the residual dispersion value of a ch on the short wavelength side until the difference between the residual dispersion values becomes excessively great, for example, to generate a dispersion residual. Since also this occurs in each span, particularly where the route is long, the dispersion tolerance is narrowed relatively. Since it is difficult to implement a dispersion compensator whose slope compensation rate is 100%, as occasion demands, the dispersion compensator 400 is composed of a residual dispersion compensator 402 for compensating for the dispersion so that the residual dispersion value of a target channel may become equal to a target value therefor and a dispersion slope compensator 404 for compensating for the slope factor of the dispersion compensator 400 so that the width between maximum and minimum values of the residual dispersion value of the residual dispersion compensator 402 may be narrowed.

For example, where the dispersion tolerance is −100 to 800 ps/nm, the width of the residual dispersion value after dispersion compensation by the residual dispersion compensator 402 is represented by RD1. If an optical signal dispersion compensated by the residual dispersion compensator 402 is slope compensated for by the dispersion slope compensator 404, then where the width of the residual dispersion value after the slope compensation is represented by RD2, the width RD2 becomes narrower than the width RD1 prior to the slope compensation. Consequently, the dispersion residual can be suppressed small, and relative narrowing of the dispersion tolerance is suppressed.

According to the present embodiment described above, since the slope by a residual dispersion compensator is compensated by means of a slope compensator, the dispersion residual can be suppressed small and relative narrowing of the dispersion tolerance is suppressed.

Twelfth Embodiment

Figure 22:
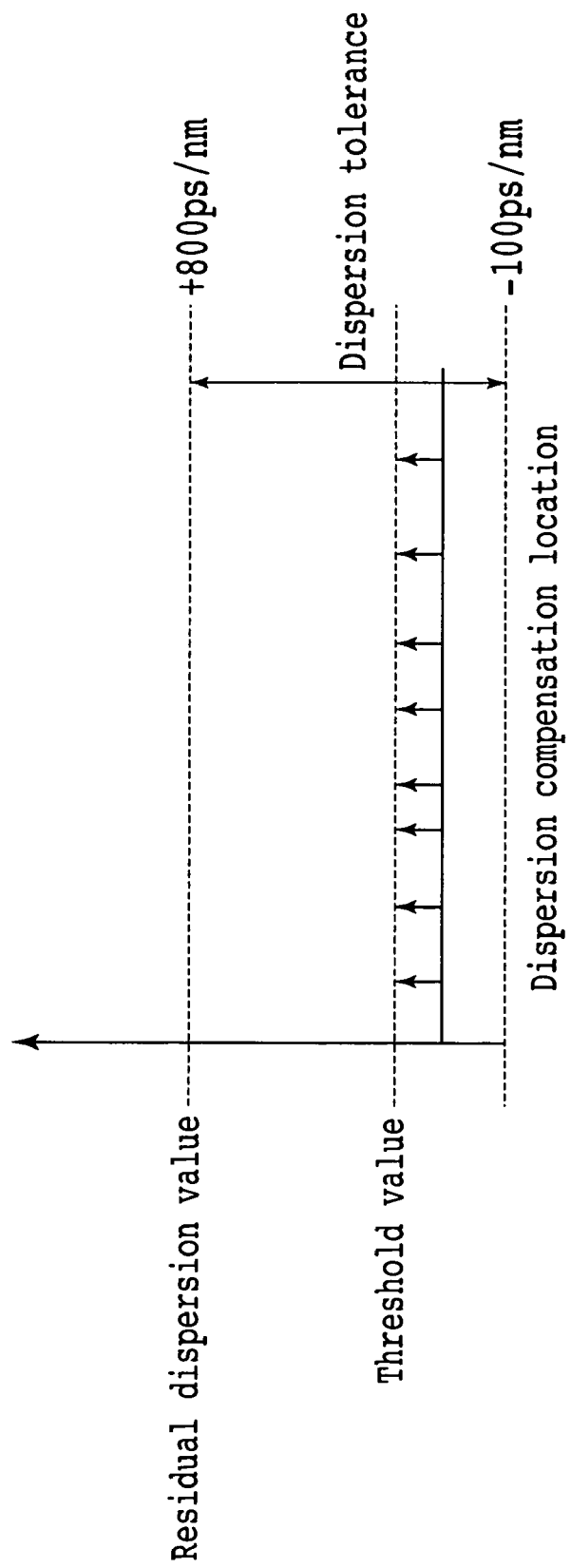
FIG. 22 is a view illustrating a threshold value setting method according to a twelfth embodiment of the present invention.

FIG. 22 is a view illustrating a setting method of a threshold value in dispersion compensator arrangement calculation according to a twelfth embodiment of the present invention. Although the chirp may assume any value, description here is given of an example wherein the chirp has a negative value. It is assumed that, where the chirp is −1, the dispersion tolerance is −100 to +800 ps/nm and eight dispersion compensation locations are involved. According to the present method, a residual dispersion equal to a threshold value in the maximum remains in each span. Further, the dispersion tolerance for residual dispersions is narrow on the negative side. Accordingly, the threshold value should be set so that, even if a residual dispersion equal to the threshold value remains in all of the spans, the residual dispersion may remain within the dispersion tolerance. In other words, the upper limit value of the dispersion tolerance should be divided by the number of dispersion compensation locations. For example, if the residual dispersion of each span is suppressed to 100 ps/nm in the maximum or less because +800/8=+100 as seen in FIG. 22, then the dispersion tolerance can be satisfied by a maximum dispersion route. Actually, a dispersion of dispersion values, a deviation in dispersion among wavelengths and so forth are taken into consideration so that the residual dispersion may fall within the dispersion tolerance.

Thirteenth Embodiment

FIGS. 23A and 23B are views showing an optical transmission network according to a thirteenth embodiment of the present invention. Although it is assumed in the fifth and sixth embodiments that all paths involve an equal chirp, if the chirp is changed over or is set variable for each path, then it is possible to reduce the number of dispersion compensators or extend the transmission distance more flexibly over an overall network. More particularly, a further greater dispersion compensation amount than that in the fifth or sixth embodiment can be summed up with that of another span.

FIG. 23A illustrates arrangement of dispersion compensators where the chirp is −1. Here, it is assumed that the maximum gain of the system is 12.5 dB. Where, in the span #2, the transmission line single mode fiber is 30 km and exhibits a loss of 7.5 dB and a dispersion compensator has a residual dispersion of −450 ps/nm and exhibits a loss of 5 dB, even if it is tried to extend the transmission distance of the span #2, this is impossible because the total loss of the single mode fiber and the dispersion compensator is 12.5 dB.

Therefore, if the chirp is changed over for each route, then the dispersion amount of the span #2 can be summed up with that of another span, and consequently, the number of dispersion compensators can be reduced and the transmission distance of the span #2 can be extended simultaneously.

FIG. 23B illustrates dispersion compensator arrangement when the chirp is changed over for each route.

For example, if the dispersion of −450 ps/nm of the span #2 is moved to the span #1 and the residual dispersion value is calculated for each path group (route), then residual dispersion at $ch1$ of the route $AB$=
  16×10−600×77/80=−418 [ps/nm]

residual dispersion at $ch40$ of the route $AB$=
  18×10−600×83/80=−443 [ps/nm]

residual dispersion at $ch1$ of the route $BC$=16×40=
  640 [ps/nm]

residual dispersion at $ch40$ of the route $BC$=
  18×40=720 [ps/nm]

residual dispersion at $ch1$ of the route $CD$=
  16× 20−300×77/80=31 [ps/nm]

residual dispersion at $ch40$ of the route $CD$=
  18×20−300×83/80=49 [ps/nm]

residual dispersion at $ch1$ of the route $AC$=
  −418+640=222 [ps/nm]

residual dispersion at $ch40$ of the route $AC$=
  −443+720=277 [ps/nm]

residual dispersion at $ch1$ of the route $BD$=
  640+31=671 [ps/nm]

residual dispersion at $ch40$ of the route $BD$=
  720+49=769 [ps/nm]

In this instance, if the chirp is set such that
  route AB: chirp ±1 or 0
  routes BC, BD: chirp −1
  routes CD, AC: chirp −1 or 0 then the dispersion tolerance can be satisfied.

If the chirp is changed over or varied for each route in this manner, then the transmission distance of the span #2 can be extended or the number of dispersion compensators can be reduced. Where a Ch (wavelength) to be used within a route is determined in advance, the residual dispersion value of the ch is calculated.

Figure 24:
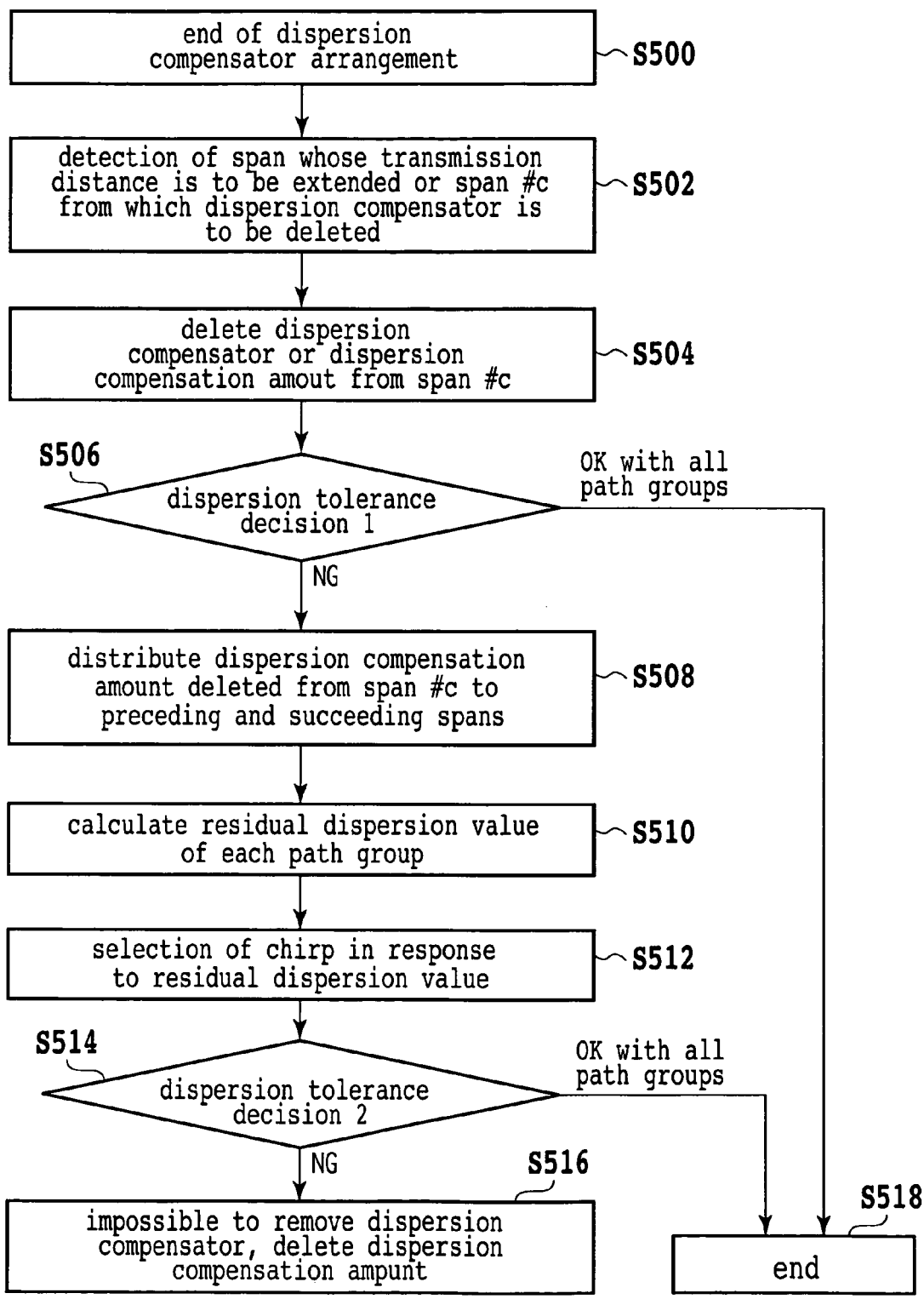
FIG. 24 is a flow chart of dispersion compensator arrangement calculation by the thirteenth embodiment of the present invention.

FIG. 24 is a flow chart of dispersion compensator arrangement calculation according to the thirteenth embodiment of the present invention.

(1) At step S500, dispersion compensator arrangement is ended. At step S502, a span whose transmission distance is to be extended or a span whose dispersion compensator is to be deleted (span whose dispersion compensation amount is comparatively small) is extracted. The extracted span is denoted by span #c.

(2) At step S504, the dispersion compensator or the dispersion compensation amount of the span #c is deleted. The dispersion compensation amount to be deleted depends upon the transmission distance to be extended, the losses of the dispersion compensator before and after the deletion and the loss factor of the transmission line. For example, if it is tried to extend the transmission distance by 10 km, then where the loss coefficient of the transmission line is 0.25 dB/km, the dispersion compensation amount to be deleted is 0.25×10=2.5 dB. The dispersion compensation amount to be deleted depends upon a relationship between the dispersion compensation amount and the loss.

(3) At step S506, it is decided whether or not all path groups satisfy the dispersion tolerance. If all path groups satisfy the dispersion tolerance, then the processing advances to step S518, at which the processing is ended. However, if some path group is present which does not satisfy the dispersion tolerance, then the processing advances to step S508.

(4) At step S508, when some path group is present which does not satisfy the dispersion tolerance, the dispersion compensation amount deleted from the span #c is distributed to the spans preceding to and following the span #c. (For example, the dispersion compensation amount is distributed so that the number of dispersion compensators may be reduced. Further, the dispersion compensation amount to be distributed to the preceding and succeeding spans may not be equal to the deleted dispersion compensation amount.)

(5) At step S510, residual dispersion values of all path groups are calculated.

(6) At step S512, the chirp is selected in response to the residual dispersion value for each path group so that the dispersion tolerance may be satisfied.

(7) At step S514, it is decided whether or not all of the path groups satisfy the dispersion tolerance. If all of the path groups satisfy the dispersion tolerance, then the processing advances to step S518, at which the processing is ended. If some path group is present which does not satisfy the dispersion tolerance, then the processing advances to step S516.

(8) At step S516, it is decided that it is impossible to reduce a dispersion compensator or the dispersion compensation amount to extend the transmission distance.

The following modifications are available.

(1) While, in the present embodiment, −1, 0 and +1 are given as examples of the chirp, for example, intermediate values such as −0.7 and +0.7 or some other values may naturally be used.

(2) In a ring network, the maximum dispersion route is determined as a go-round route of the ring to perform dispersion compensation. Although usually it is not necessary to set a path which goes round a ring, there is the possibility that a go-round route of a ring may be used upon testing or the like.

(3) In the same route, the location at which a reproducing unit is to be placed may possibly differ among different channels (wavelengths). In this instance, the path length even in the same route differs depending upon the channel. Therefore, it is effective to provide a dispersion compensator based on the longest path in the same route.

(4) Although the maximum dispersion route in a ring network is a "route which does not include the minimum dispersion span", this does not apply where the protection is not used or where a specific operation form is used.

(5) A dispersion compensator may be provided in each node or in a repeater intermediately of a transmission line or in both of them.

According to the present invention described above, the dispersion compensation amount or/and the number of dispersion compensators can be reduced when compared with those of the conventional system. Further, the properties required for an optical amplifier depending upon the system can be moderated and the cost can be reduced. Further, the transmission distance can be extended.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical transmission network, comprising:
a first dispersion compensator arranged in a maximum dispersion span having a maximum dispersion value and searched out from within a maximum dispersion route having a maximum dispersion value from among routes of non-regeneration intervals within which a dispersion value before dispersion compensation does not satisfy an upper limit of a dispersion tolerance; and
a second dispersion compensator arranged in a maximum dispersion span having a maximum dispersion value and searched out from within a maximum dispersion route having a maximum dispersion value from among the routes when a dispersion compensator is successively arranged until a route of a non-regeneration interval which does not satisfy the dispersion tolerance does not remain any more based on the dispersion value after the dispersion compensation with respect to the searched out maximum dispersion span,
wherein the dispersion compensation amounts of said first and second dispersion compensators are such that, when the dispersion compensation amount of the maximum dispersion span in which said first and second dispersion compensators are arranged is successively increased, the span has a residual dispersion value equal to or higher than a fixed range and the maximum dispersion route which relates to the spans has a residual dispersion value which satisfies the dispersion tolerance or the span has a residual dispersion value which is within the fixed range.

2. An optical transmission network according to claim 1, wherein said optical transmission network is an optical ring network, and the dispersion compensation amounts of said first and second dispersion compensators are an integral number of times a unit amount.

3. An optical transmission network according to claim 1, wherein said optical transmission network is an optical linear network, and the dispersion compensation amounts of said first and second dispersion compensators are an integral number of times a unit amount.

4. An optical transmission network according to claim 2, wherein a dispersion compensator having a dispersion compensation amount obtained by repeating an operation of decrementing the dispersion compensation amount of a minimum dispersion span in the routes of the non-regeneration intervals which do not satisfy a lower limit of the dispersion tolerance by the unit amount or incrementing the positive dispersion compensation amount of the minimum dispersion span by the unit amount until the span satisfies the lower limit of the dispersion tolerance is provided in the minimum dispersion span.

5. An optical transmission network according to claim 3, wherein a dispersion compensator having a dispersion compensation amount obtained by repeating an operation of decrementing the dispersion compensation amount of a minimum dispersion span in the routes of the non-regeneration intervals which do not satisfy a lower limit of the dispersion tolerance by the unit amount or incrementing the positive dispersion compensation amount of the minimum dispersion span by the unit amount until the span satisfies the lower limit of the dispersion tolerance is provided in the minimum dispersion span.

6. An optical transmission network according to claim 1, wherein said optical transmission network is a ring network, and a path which goes round the ring is the maximum dispersion route.

7. An optical transmission network according to claim 1, wherein, when the chirp is in the negative, the lower limit of the fixed range is zero.

8. An optical transmission network according to claim 1, wherein, when the chirp is in the positive, the upper limit of the fixed range is zero.

9. An optical transmission network according to claim 1, further comprising a dispersion compensator of a dispersion compensation amount calculated using the fixed range with regard to a maximum dispersion span of a next maximum dispersion route, the fixed range being selected based on the residual dispersion value of the maximum dispersion span.

10. An optical transmission network according to claim 1, wherein at least one of said first and second dispersion compensators includes a residual dispersion compensator and a slope compensator, said residual dispersion compensator compensating for the dispersion with the dispersion compensation amount of the span in which said residual dispersion compensator is arranged in a target channel, said slope compensator reducing the width between a residual dispersion maximum channel and a residual dispersion minimum channel of said residual dispersion compensator.

11. An optical transmission network according to claim 1, wherein each of the routes of the non-regeneration intervals is a route of a channel whose non-regeneration interval is the longest.

12. An optical transmission network according to claim 1, wherein the fixed range is a range equal to or higher than 0 but equal to or lower than a threshold value, or another range equal to or higher than a threshold value but equal to or lower than zero, or a further range equal to or higher than a first threshold value but equal to or lower than a second threshold value.

13. An optical transmission network according to claim 12, wherein the threshold values or the first and second threshold values are determined based on a result of distribution to an upper limit value or a lower limit value of the dispersion tolerance.

14. An optical transmission network according to claim 1, wherein said first and second dispersion compensators are arranged in a node or a repeater intermediately of a transmission line or in both of a node and a repeater.

15. An optical transmission network, comprising:
a second optical transmission network which is formed except dispersion compensators arranged in said optical transmission network and has a second chirp smaller than a first chirp of said optical transmission network including:
a first dispersion compensator arranged in a maximum dispersion span having a maximum dispersion value and searched out from within a maximum dispersion route having a maximum dispersion value from among routes of non-regeneration intervals within which a dispersion value before dispersion compensation does not satisfy an upper limit of a dispersion tolerance where the second chirp is used; and
a second dispersion compensator arranged in a maximum dispersion span having a maximum dispersion value and searched out from within a maximum dispersion route having a maximum dispersion value from among the routes when a dispersion compensator is successively arranged until a route of a non-regeneration interval which does not satisfy the dispersion tolerance does not remain any more based on the dispersion value after the dispersion compensation with respect to the searched out maximum dispersion span,
wherein the dispersion compensation amounts of said first and second dispersion compensators are such that, when the dispersion compensation amount of the maximum dispersion span in which said first and second dispersion compensators are arranged is successively increased, the span has a residual dispersion value equal to or higher than a fixed range and the maximum dispersion route which relates to the spans has a residual dispersion value which satisfies the dispersion tolerance or the span has a residual dispersion value which is within the fixed range;
said optical transmission network is configured such that the dispersion compensation amount of the span in which that one of said first and second dispersion compensators arranged in said second transmission network which has a minimum dispersion compensation amount is zero and all of the routes satisfy the dispersion tolerance at the first chirp.

16. An optical transmission network according to claim 13, wherein the dispersion compensation amount of the span in which said first or second dispersion compensator whose dispersion compensation amount is in the minimum is distributed to preceding and succeeding spans to the span.

17. An optical transmission network, comprising:
a second optical transmission network which has a second chirp smaller than a first chirp of said optical transmission network including:
a first dispersion compensator arranged in a maximum dispersion span having a maximum dispersion value and searched out from within a maximum dispersion route having a maximum dispersion value from among routes of non-regeneration intervals within which a dispersion value before dispersion compensation does not satisfy an upper limit of a dispersion tolerance where the second chirp is used; and
a second dispersion compensator arranged in a maximum dispersion span having a maximum dispersion value and searched out from within a maximum dispersion route having a maximum dispersion value from among the routes when a dispersion compensator is successively arranged until a route of a non-regeneration interval which does not satisfy the dispersion tolerance does not remain any more based on the dispersion value after the dispersion compensation with respect to the searched out maximum dispersion span,
wherein the dispersion compensation amounts of said first and second dispersion compensators are such that, when the dispersion compensation amount of the maximum dispersion span in which said first and second dispersion compensators are arranged is successively increased, the span has a residual dispersion value equal to or higher than a fixed range and the maximum dispersion route which relates to the spans has a residual dispersion value which satisfies the dispersion tolerance or the span has a residual dispersion value which is within the fixed range;

said optical transmission network is configured such that the dispersion compensation amount of the span whose transmission distance is to be extended from within said second transmission network is zero or smaller than the dispersion compensation amounts of said first and second dispersion compensators in which the span is arranged in said second optical transmission network and all of the routes satisfy the dispersion tolerance at the first chirp.

18. An optical transmission network according to claim 17, wherein the dispersion compensation amount in said second optical transmission network of the span whose transmission distance is to be extended is distributed to preceding and succeeding spans to the span.

19. An optical transmission network, comprising:
a second optical transmission network which has a fixed first chirp including:
a first dispersion compensator arranged in a maximum dispersion span having a maximum dispersion value and searched out from within a maximum dispersion route having a maximum dispersion value from among routes of non-regeneration intervals within which a dispersion value before dispersion compensation does not satisfy an upper limit of a dispersion tolerance where the first chirp is used; and
a second dispersion compensator arranged in a maximum dispersion span having a maximum dispersion value and searched out from within a maximum dispersion route having a maximum dispersion value from among the routes when a dispersion compensator is successively arranged until a route of a non-regeneration interval which does not satisfy the dispersion tolerance does not remain any more based on the dispersion value after the dispersion compensation with respect to the searched out maximum dispersion span,
wherein the dispersion compensation amounts of said first and second dispersion compensators are such that, when the dispersion compensation amount of the maximum dispersion span in which said first and second dispersion compensators are arranged is successively increased, the span has a residual dispersion value equal to or higher than a fixed range and the maximum dispersion route which relates to the spans has a residual dispersion value which satisfies the dispersion tolerance or the span has a residual dispersion value which is within the fixed range;
said optical transmission network has a route which has a second chirp different from the first chirp and in which dispersion compensator is deleted from or a dispersion compensation amount is decreased in a span whose transmission distance is to be extended in said second optical transmission network or a span from which a dispersion compensator is to be deleted.

20. A dispersion compensator arrangement calculation apparatus for arranging dispersion compensators in an optical transmission network, comprising:
a span dispersion value calculation section for calculating a dispersion value of each span;
a maximum dispersion route detection section for detecting, from among routes of non-regeneration intervals each having a dispersion value which does not satisfy an upper limit of a dispersion tolerance, a maximum dispersion route having a maximum dispersion value based on dispersion values after dispersion compensation with regard to those spans whose dispersion compensation amount is calculated already and dispersion values calculated by said span dispersion value calculation section with regard to the other spans;
a maximum dispersion span detection section for detecting a maximum dispersion span in the maximum dispersion route;
a dispersion tolerance decision section for deciding, when the maximum dispersion span is dispersion compensated with a first dispersion compensation amount, whether or not a residual dispersion value after the dispersion compensation of the maximum dispersion route is within the dispersion tolerance; and
a dispersion compensation amount calculation section for calculating, when the residual dispersion value by the dispersion compensation amount of the maximum dispersion span is equal to or higher than a fixed range and the dispersion compensation amount is the first dispersion compensation amount, the dispersion compensation amount when it is decided by said dispersion tolerance decision section that the residual dispersion value is within the dispersion tolerance or a dispersion compensation amount with which the residual dispersion amount remains within the fixed range;
said maximum dispersion route detection section, dispersion tolerance decision section and dispersion compensation amount calculation section repetitively performing respective processing until after a route of a non-regeneration interval which does not satisfy the dispersion tolerance remains any more.

21. A dispersion compensator arrangement calculation apparatus according to claim 20, further comprising a dispersion measuring instrument for measuring a dispersion of an optical signal received by a node apparatus which is a component of said optical transmission network, said span dispersion value calculation section calculating the dispersion values of the spans based on dispersion values measured by said dispersion measuring instrument.

22. A dispersion compensator arrangement calculation apparatus according to claim 20, further comprising a dispersion measuring instrument for measuring a dispersion of an optical signal received by a node which is a component of a wavelength division multiplexing optical transmission network and includes a first fixed dispersion compensator and a plurality of second dispersion compensators having different dispersion compensation amounts and a dispersion compensator selection section for selecting an optimum one of said second dispersion compensators based on the dispersion compensation amount of said node calculated by said dispersion compensation amount calculation section, said span dispersion value calculation section calculating the dispersion value of the span based on the dispersion value measured by said dispersion measuring instrument.

23. A dispersion compensator arrangement calculation apparatus according to claim 20, further comprising a dispersion measuring instrument for measuring a dispersion of an optical signal received by a receiver of a node which is a component of said optical transmission network and includes a variable dispersion compensator and a variable dispersion compensator control section for controlling the dispersion compensation amount of said variable dispersion compensator based on the dispersion compensation amount of the node calculated by said dispersion compensation amount calculation section, said span dispersion value calculation section calculating the dispersion value of the span based on the dispersion value measured by said dispersion measuring instrument.

24. A dispersion compensator arrangement calculation method for an optical transmission network, comprising:
- a span dispersion value calculation step of calculating a dispersion value of each span;
- a maximum dispersion route detection step of detecting, from among routes of non-regeneration intervals each having a dispersion value which does not satisfy an upper limit of a dispersion tolerance when the chirp is in the negative, a maximum dispersion route having a maximum dispersion value based on dispersion values after dispersion compensation with regard to those spans whose dispersion compensation amount is calculated already and dispersion values calculated by the span dispersion value calculation step with regard to the other spans;
- a maximum dispersion span detection step of detecting a maximum dispersion span in the maximum dispersion route;
- a dispersion tolerance decision step of deciding, when the maximum dispersion span is dispersion compensated with a first dispersion compensation amount, whether or not a residual dispersion value after the dispersion compensation of the maximum dispersion route is within the dispersion tolerance; and
- a dispersion compensation amount calculation step of calculating, when the residual dispersion value by the dispersion compensation amount of the maximum dispersion span is equal to or higher than a fixed range and the dispersion compensation amount is the first dispersion compensation amount, the dispersion compensation amount when it is decided by the dispersion tolerance decision step that the residual dispersion value is within the dispersion tolerance or a dispersion compensation amount with which the residual dispersion amount remains within the fixed range;
- the maximum dispersion route detection step, dispersion tolerance decision step and dispersion compensation amount calculation step being repetitively performed until after a route of a non-regeneration interval which does not satisfy the dispersion tolerance remains any more;
- the dispersion compensator arrangement calculation method adopting, where a dispersion tolerance when all of the routes have a chirp greater than the negative chirp is satisfied by decreasing a dispersion compensation amount of a minimum dispersion span to zero and distributing the dispersion compensation amount of the span to preceding and succeeding spans to the span, a result of dispersion compensator arrangement with the greater chirp.

25. A dispersion compensator arrangement calculation method for an optical transmission network, comprising:
- a span dispersion value calculation step of calculating a dispersion value of each span;
- a maximum dispersion route detection step of detecting, from among routes of non-regeneration intervals each having a dispersion value which does not satisfy an upper limit of a dispersion tolerance when the chirp is in the negative, a maximum dispersion route having a maximum dispersion value based on dispersion values after dispersion compensation with regard to those spans whose dispersion compensation amount is calculated already and dispersion values calculated by the span dispersion value calculation step with regard to the other spans;
- a maximum dispersion span detection step of detecting a maximum dispersion span in the maximum dispersion route;
- a decision step of deciding, when the maximum dispersion span is dispersion compensated with a first dispersion compensation amount, whether or not a residual dispersion value after the dispersion compensation of the maximum dispersion route is within the dispersion tolerance and whether or not the sum of a loss based on the first dispersion compensation amount and a transmission line loss in the span is within a maximum system gain; and
- a dispersion compensation amount calculation step of calculating, when the residual dispersion value by the dispersion compensation amount of the maximum dispersion span is equal to or higher than a fixed range and the dispersion compensation amount is the first dispersion compensation amount, a dispersion compensation amount when it is decided by the decision step that the residual dispersion value is within the dispersion tolerance and the sum of the loss based on the first dispersion compensation amount and the transmission line loss in the span is within the maximum system gain or a dispersion compensation amount with which the residual dispersion amount remains within the fixed range;
- the maximum dispersion route detection step, decision step and dispersion compensation amount calculation step being repetitively performed until after a route of a non-regeneration interval which does not satisfy the dispersion tolerance remains any more,
- wherein the transmission distance of a minimum dispersion span is extended by decreasing a dispersion compensation amount of the span to zero, setting, when the sum of the loss based on the dispersion compensation amount of the span and the transmission line loss is proximate to the maximum system gain, the chirp so as to be greater than the negative chirp, and the dispersion compensation amount of the span to be zero or decreased, and distributing the dispersion compensation amount to preceding and succeeding spans to the span.

26. A dispersion compensator arrangement calculation method for an optical transmission network, comprising:
- a span dispersion value calculation step of calculating a dispersion value of each span;
- a maximum dispersion route detection step of detecting, from among routes of non-regeneration intervals each having a dispersion value which does not satisfy an upper limit of a dispersion tolerance when the chirp is a fixed first chirp, a maximum dispersion route having a maximum dispersion value based on dispersion values after dispersion compensation with regard to those spans whose dispersion compensation amount is calculated already and dispersion values calculated by the span dispersion value calculation step with regard to the other spans;
- a maximum dispersion span detection step of detecting a maximum dispersion span in the maximum dispersion route;
- a decision step of deciding, when the maximum dispersion span is dispersion compensated with a first dispersion compensation amount, whether or not a residual dispersion value after the dispersion compensation of the maximum dispersion route is within the dispersion tolerance and whether or not the sum of a loss based on the first dispersion compensation amount and a transmission line loss in the span is within a maximum system gain; and a dispersion compensation amount calculation step of calculating, when the residual dispersion value by the dispersion compensation amount of the maximum dispersion span is equal to or higher than a fixed range and the dispersion compensation amount is the first dispersion compensation amount, a dispersion compensation amount when it is decided by the decision step that the residual dispersion value is within the dispersion tolerance and the sum of the loss based on the first dispersion compensation amount and the transmission line loss in the span is within the maximum system gain or a dispersion compensation amount with which the residual dispersion amount remains within the fixed range, wherein the maximum dispersion route detection step, decision step and dispersion compensation amount calculation step are repetitively performed until after a route of a non-regeneration interval which does not satisfy the dispersion tolerance remains any more to perform distribution compensator arrangement calculation, whereafter a dispersion compensator is removed or a dispersion compensation amount is decreased from a span whose transmission distance is to be extended or from a span from which a dispersion compensator is removed and the dispersion compensation amount reduced thereby is distributed to preceding and succeeding spans, and the chirp is selected based on the residual dispersion value of the route.

* * * * *